(12) United States Patent
Frost et al.

(10) Patent No.: US 10,946,966 B2
(45) Date of Patent: Mar. 16, 2021

(54) MULTI-PANEL PRIVACY SCREEN ASSEMBLY

(71) Applicant: B/E Aerospace, Inc., Winston-Salem, NC (US)

(72) Inventors: Ian L. Frost, Winston-Salem, NC (US); Shirley E. Govea Bravo, Winston-Salem, NC (US); John R. Kuyper, Winston-Salem, NC (US); Robert J. Lawrence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 232 days.

(21) Appl. No.: 16/173,395

(22) Filed: Oct. 29, 2018

(65) Prior Publication Data
US 2020/0130840 A1 Apr. 30, 2020

(51) Int. Cl.
| | |
|---|---|
| *B64D 11/00* | (2006.01) |
| *E05F 15/643* | (2015.01) |
| *E05F 15/662* | (2015.01) |
| *E05D 15/08* | (2006.01) |
| *E05D 15/10* | (2006.01) |

(52) U.S. Cl.
CPC .......... *B64D 11/0023* (2013.01); *E05D 15/08* (2013.01); *E05D 15/1081* (2013.01); *E05F 15/643* (2015.01); *E05F 15/662* (2015.01); *E05Y 2900/502* (2013.01)

(58) Field of Classification Search
CPC .............. B64D 11/023; B64D 11/0606; B64D 11/0023; E05Y 2900/142; E05Y 2900/502; E05F 15/643; E05F 15/662; E05D 15/068; E05D 15/0652; E05D 15/08; E05D 15/1081
See application file for complete search history.

(56) References Cited

U.S. PATENT DOCUMENTS

| | | | | |
|---|---|---|---|---|
| 2,657,436 A | * | 11/1953 | Fairhurst ................. | E04B 2/827 52/64 |
| 2,944,282 A | * | 7/1960 | Greco ..................... | E04B 2/827 16/87 R |
| 3,235,915 A | * | 2/1966 | Glaser ................. | E05D 15/0608 52/64 |
| 4,998,577 A | * | 3/1991 | Kobayashi .......... | E05D 15/0608 160/197 |
| 5,016,318 A | * | 5/1991 | Harris ................. | E05D 15/0608 16/95 R |

(Continued)

*Primary Examiner* — Andrew J Triggs
(74) *Attorney, Agent, or Firm* — Suiter Swantz pc llo

(57) ABSTRACT

A multi-panel privacy screen assembly adapted to be deployed between laterally-adjacent passenger seats. The assembly includes an overhead beam having a plurality of tracks, a plurality of hanging panels, a plurality of coupling members suspending each of the plurality of hanging panels from the overhead beam, each coupling member coupled to one of the plurality of hanging panels, to one of a plurality of driven cables, and having rollers rollable along at least one of the plurality of tracks, and a drive mechanism including an intermittent gear assembly operable for driving the plurality of driven cables to move the plurality of hanging panels along at least one of the plurality of tracks according to predetermined deployment sequence.

17 Claims, 23 Drawing Sheets

(56) References Cited

U.S. PATENT DOCUMENTS

| | | | |
|---|---|---|---|
| 5,022,454 A * | 6/1991 | Kobayashi | E05D 15/0608 160/197 |
| 5,088,236 A * | 2/1992 | Karhu | E05D 15/0608 49/127 |
| 5,230,123 A * | 7/1993 | Williams | E05D 15/0613 16/95 R |
| 5,329,857 A * | 7/1994 | Owens | E01B 25/26 104/103 |
| 5,794,381 A | 8/1998 | Rizkovsky | |
| 5,804,931 A * | 9/1998 | Schack | E05D 15/0608 16/87 R |
| 6,286,258 B1 * | 9/2001 | Bischof | E05D 15/0608 49/127 |
| 6,286,277 B1 * | 9/2001 | Blobaum | E05D 15/0608 52/243.1 |
| 6,481,359 B1 * | 11/2002 | Owens | E05D 15/0608 104/103 |
| 7,185,589 B2 * | 3/2007 | Owens | E05D 15/0608 104/89 |
| 7,367,159 B2 | 5/2008 | Delgadov | |
| 8,375,638 B2 | 2/2013 | Guillaume et al. | |
| 8,464,469 B2 | 6/2013 | Oberheide | |
| 8,579,006 B2 * | 11/2013 | Levin | E04B 2/827 160/184 |
| 8,627,621 B2 * | 1/2014 | Liebscher | E05D 15/0608 52/238.1 |
| 8,806,807 B2 | 8/2014 | Rees | |
| 10,077,588 B1 * | 9/2018 | Header | E05D 15/063 |
| 10,196,815 B2 * | 2/2019 | Dickson | E05D 15/063 |
| 10,231,563 B2 * | 3/2019 | Colacecchi | B64D 11/0023 |
| 10,309,138 B2 * | 6/2019 | Header | E05D 15/063 |
| 10,465,383 B2 * | 11/2019 | Dickson | E05F 15/643 |
| 2003/0226315 A1 * | 12/2003 | Haab | E06B 3/5436 49/127 |
| 2005/0011398 A1 * | 1/2005 | Owens | E05D 15/0608 104/94 |
| 2005/0210752 A1 * | 9/2005 | Schulte | E05F 1/046 49/360 |
| 2006/0096494 A1 * | 5/2006 | Owens | E05D 15/0608 104/88.01 |
| 2006/0103343 A1 * | 5/2006 | Haab | E05F 15/638 318/825 |
| 2011/0138692 A1 | 6/2011 | Lemstra | |
| 2012/0144627 A1 * | 6/2012 | Liebscher | E05D 15/0608 16/96 R |
| 2016/0251852 A1 * | 9/2016 | Dickson | E05F 15/632 160/7 |
| 2017/0218683 A1 * | 8/2017 | Shanahan | E05D 15/12 |
| 2018/0044966 A1 * | 2/2018 | Brand | E05F 15/643 |
| 2018/0209145 A1 * | 7/2018 | Dickson | E05D 15/0608 |
| 2018/0216394 A1 * | 8/2018 | Mareaux | B61B 1/02 |
| 2020/0130840 A1 * | 4/2020 | Frost | E05D 15/10 |

\* cited by examiner

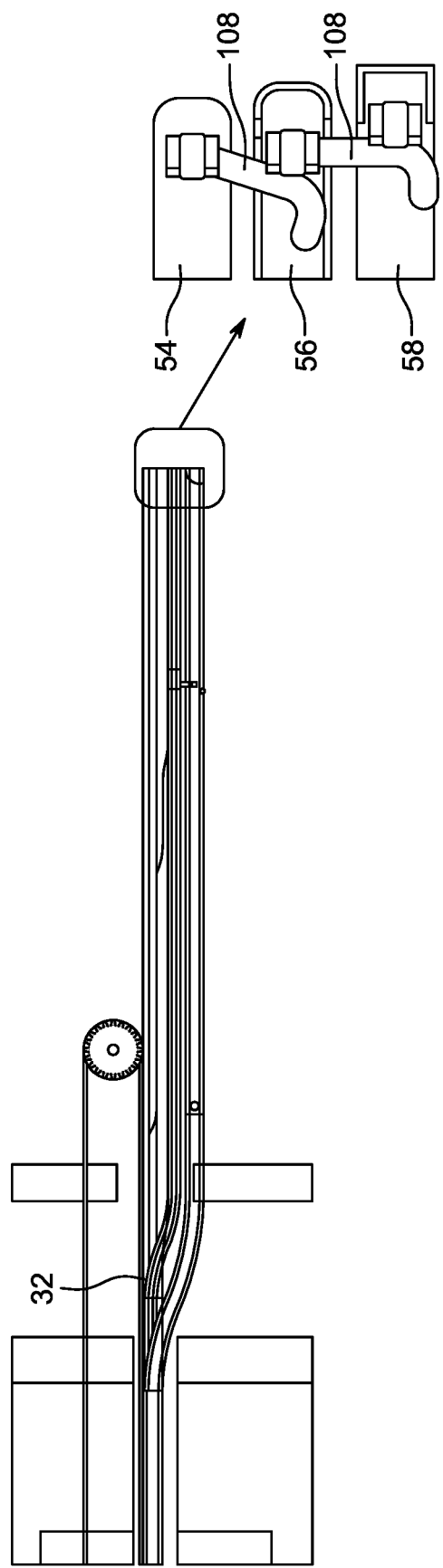

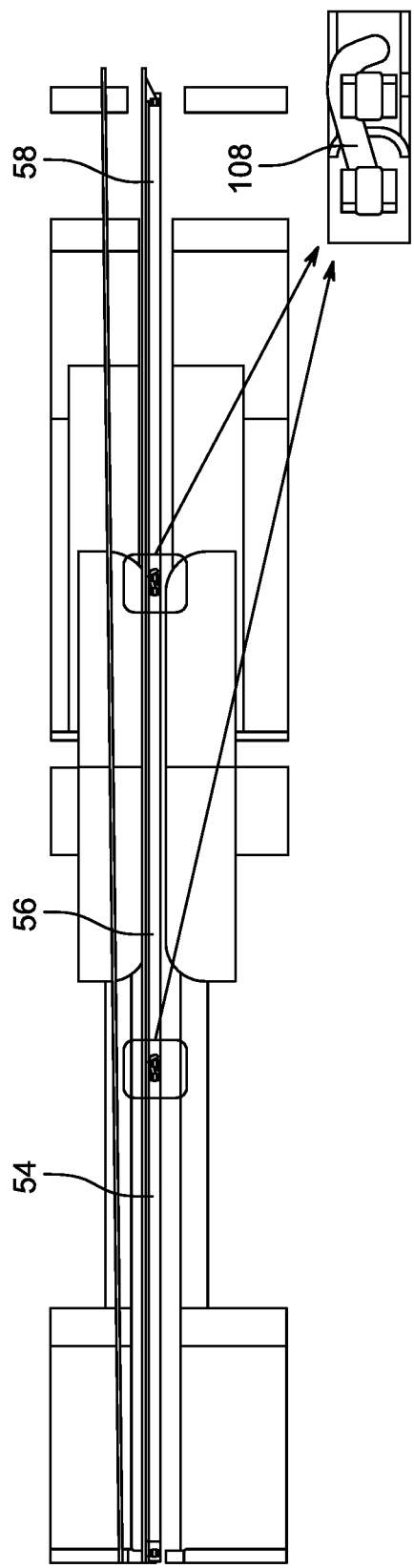

MULTI-PANEL PRIVACY SCREEN ASSEMBLY

BACKGROUND

Business and premium seating classes are common on passenger aircraft, particularly on widebody aircraft used for long-haul flights. Such seating classes include greater seat adjustability, living space, and amenities as compared to economy seating classes. Business class configurations can include laterally and longitudinally adjacent seats in various arrangements. Partitions can be used to enhance privacy between adjacent seats.

Conventional partitions include both fixed and deployable types. Fixed partitions are typically utilized between longitudinally adjacent seats where there is no need or desire to relax privacy during flight. Fixed partitions can include walls and other structures that secure to the deck. Deployable partitions are typically utilized adjacent an aisle and between laterally adjacent seats. Deployable partitions are used where desirable to change the degree of privacy during flight. For example, a deployable partition can include a door for accessing a passenger suite from the aisle. During taxi, take off and landing (TTOL) the door may be required to remain open, while during flight the door can be closed for privacy. Another example of deployable partition includes a partition disposed between laterally adjacent seats, wherein the partition is configured to transition vertically or horizontally to divide or connect the adjacent seat spaces. Such partitions typically include a single panel configured to slide along a horizontal floor track or along the top of a shared console.

What is desirable is a deployable partition configured with separate panels, such that the panels can be deployed separately or in a predetermined sequence depending upon the flight status, privacy desires of the passengers, etc. Also desirable is a partition configuration free of attachment to the floor, thereby obviating the need for installing partition floor tracks. Such a partition configuration would accommodate a long seat span while allowing customizable deployment of the separate panels, among other benefits and advantages.

BRIEF SUMMARY

In one aspect, an embodiment of the inventive concepts disclosed herein is directed to a multi-panel privacy screen assembly including an elongated beam having a plurality of tracks, a plurality of hanging panels, coupling members suspending each of the plurality of hanging panels from the elongated beam, each coupling member having a first end coupled near a top edge of one of the plurality of hanging panels, a second end coupled to one of a plurality of driven cables, and rollers rollable along at least one of the plurality of tracks, and a drive mechanism operable for driving the plurality of driven cables to move the plurality of hanging panels along at least one of the plurality of tracks, wherein when fully stowed the plurality of hanging panels are in a stacked arrangement on separate ones of the plurality of tracks, and when fully deployed the plurality of hanging panels are inline along one of the plurality of tracks.

In some embodiments, the plurality of tracks includes a first track spanning substantially the length of the elongated beam, a second track disposed at a storage end of the multi-panel privacy screen assembly having a linear track portion parallel with the first track and a curved track end transitioning the second track into the first track, and a third track disposed at a storage end of the multi-panel privacy screen assembly having a linear track portion parallel with the first track and a curved track end transitioning the third track into the first track.

In some embodiments, the first track is disposed between the second and third tracks such that the second and third tracks transition into the first track from opposing sides of the first track.

In some embodiments, the plurality of hanging panels includes a first panel, a second panel, and a third panel, wherein the first panel travels along the first track between stowed and deployed positions of the first panel, the second panel travels along the second and first tracks between the stowed and deployed positions of the second panel, and the third panel travels along the third and first tracks between the stowed and deployed positions of the third panel.

In some embodiments, the first, second and third hanging panels deploy according to a predetermined sequence in which the first panel deploys first, the second panel deploys second, and the third panel deploys third.

In some embodiments, the second and third tracks and a portion of the first track coincident with the second and third tracks are disposed within a storage area adapted to be positioned aft of laterally-adjacent passenger seats to be separated by the plurality of hanging panels.

In some embodiments, the drive mechanism includes an intermittent gear assembly including a motor driven shaft, a plurality of intermittent driver gears rotatably coupled to the motor-driven shaft, wherein the number of intermittent driver gears corresponds to the number of hanging panels, a plurality of driven gears each meshed with one of the plurality of intermittent driver gears, each of the plurality of driven gears rotatably coupled to a driven shaft, wherein the number of driven gears corresponds to the number of intermittent driver gears, and a plurality of pulleys, wherein each pulley is rotatably coupled to one of the plurality of driven shafts, and wherein the number of pulleys corresponds to the number of driven gears, wherein each of the plurality of pulleys is configured to drive motion of one of the plurality of driven cables each coupled to one of the plurality of hanging panels.

In some embodiments, each of the plurality of intermittent driver gears has a predetermined tooth configuration and relative fixed position on the motor-driven shaft with respect to the other ones of the plurality of intermittent driver gears to deploy the plurality of hanging panels according to a predetermined deployment sequence.

In some embodiments, the assembly further includes at least one set of directional pulleys configured to guide a directional change of the plurality of driven cables extending between the drive mechanism and the plurality of hanging panels.

In some embodiments, the assembly further includes a plurality of cable tensioners each operably coupled to one of the plurality of driven cables, each cable tensioner including a spring affixed at one end to a static element and coupled at an opposing end to one of the plurality of driven cables.

In another aspect, an embodiment of the inventive concepts disclosed herein is directed to a multi-panel privacy screen assembly including an elongated overhead beam having a first track, a second, track, and a third track, wherein the first track spans substantially the length of the elongated overhead beam and each of the second and third tracks span a portion of one end of the length of the elongated overhead beam and has a linear track portion parallel with the first track and a curved track end transitioning into the first track, first, second and third hanging panels each suspended from the elongated overhead beam, coupling members suspending each of the first, second and third hanging panels from the elongated overhead beam, each coupling member having a first end coupled to one of the hanging panels, a second end coupled to one of a plurality of driven cables, and rollers rollable along at least one of the first, second and third tracks, wherein the plurality of driven cables comprises a first driven cable driving motion of the first hanging panel, a second driven cable driving motion of the second hanging panel, and a third driven cable driving motion of the third handling panel, and a drive mechanism operable for driving the first, second and third driven cables to move the respective first, second and third hanging panels along at least one of the first, second and third tracks between deployed and stowed positions.

In some embodiments, wherein when fully stowed the first, second and third hanging panels are in a stacked arrangement on the respective first, second and third tracks, and when fully deployed the first, second and third hanging panels are inline along the first track.

In some embodiments, the first hanging panel travels along the first track between stowed and deployed positions of the first hanging panel, the second hanging panel travels along the second and first tracks between the stowed and deployed positions of the second hanging panel, and the third hanging panel travels along the third and first tracks between the stowed and deployed positions of the third hanging panel.

In some embodiments, the first, second and third hanging panels deploy according to a predetermined sequence in which the first hanging panel deploys first, the second hanging panel deploys second, and the third hanging panel deploys third.

In some embodiments, the drive mechanism is an intermittent gear assembly including a motor driven shaft, first, second and third intermittent driver gears rotatably coupled to the motor-driven shaft, wherein the first, second and third intermittent driver gears correspond to the first, second and third hanging panels, respectively, first, second and third driven gears rotatably coupled to respective first, second and third driven shafts, wherein the first, second and third driven gears are meshed with the respective first, second and third intermittent driver gears, and first, second and third drive pulleys rotatably coupled to the respective first, second and third driven shafts, wherein each of the plurality of pulleys is configured to drive motion of one of the plurality of driven cables.

In some embodiments, each of the first, second and third driver gears has a predetermined tooth configuration and relative fixed position on the motor driven shaft with respect to the other ones of the intermittent driver gears to deploy the first, second and third hanging panels according to a predetermined deployment sequence.

In some embodiments, the assembly further includes at least one set of directional pulleys configured to guide a directional change of the plurality of driven cables coupled to the first, second and third hanging panels.

In some embodiments, the assembly further includes a plurality of cable tensioners, each of the plurality of cable tensioners operably coupled to one of the plurality of driven cables, each cable tensioner including a spring affixed at one end to a static element and coupled at an opposing end to one of the plurality of driven cables.

In another aspect, an embodiment of the inventive concepts disclosed herein is directed to a multi-panel privacy screen assembly including an overhead beam having a plurality of tracks, a plurality of panels, a plurality of coupling members suspending each of the plurality of hanging panels from the overhead beam, each coupling member coupled to one of the plurality of hanging panels and one of a plurality of driven cables, and having rollers rollable along at least one of the plurality of tracks, and a drive mechanism including an intermittent gear assembly operable for driving the plurality of driven cables to move the plurality of hanging panels along at least one of the plurality of tracks according to predetermined deployment sequence.

In some embodiments, each of the plurality of driven cables is coupled to one of the plurality of hanging panels, and wherein when fully stowed the plurality of hanging panels are in a stacked arrangement on separate ones of the plurality of tracks, and when fully deployed the plurality of hanging panels are inline along one of the plurality of tracks.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature or function. In the drawings:

FIG. 20A is a top plan view of the storage end of the privacy screen assembly utilizing the panel deployment mechanism of FIG. 18;

FIG. 20B is a detailed view of FIG. 20A showing spring-loaded lever arms;

FIG. 22A is a top plan view of the privacy screen assembly of FIG. 21 A showing the panels fully deployed;

FIG. 22B is a detailed view of FIG. 22A showing spring-loaded lever arm and pin engagement;

DETAILED DESCRIPTION OF EXEMPLARY EMBODIMENTS

Figure 1:
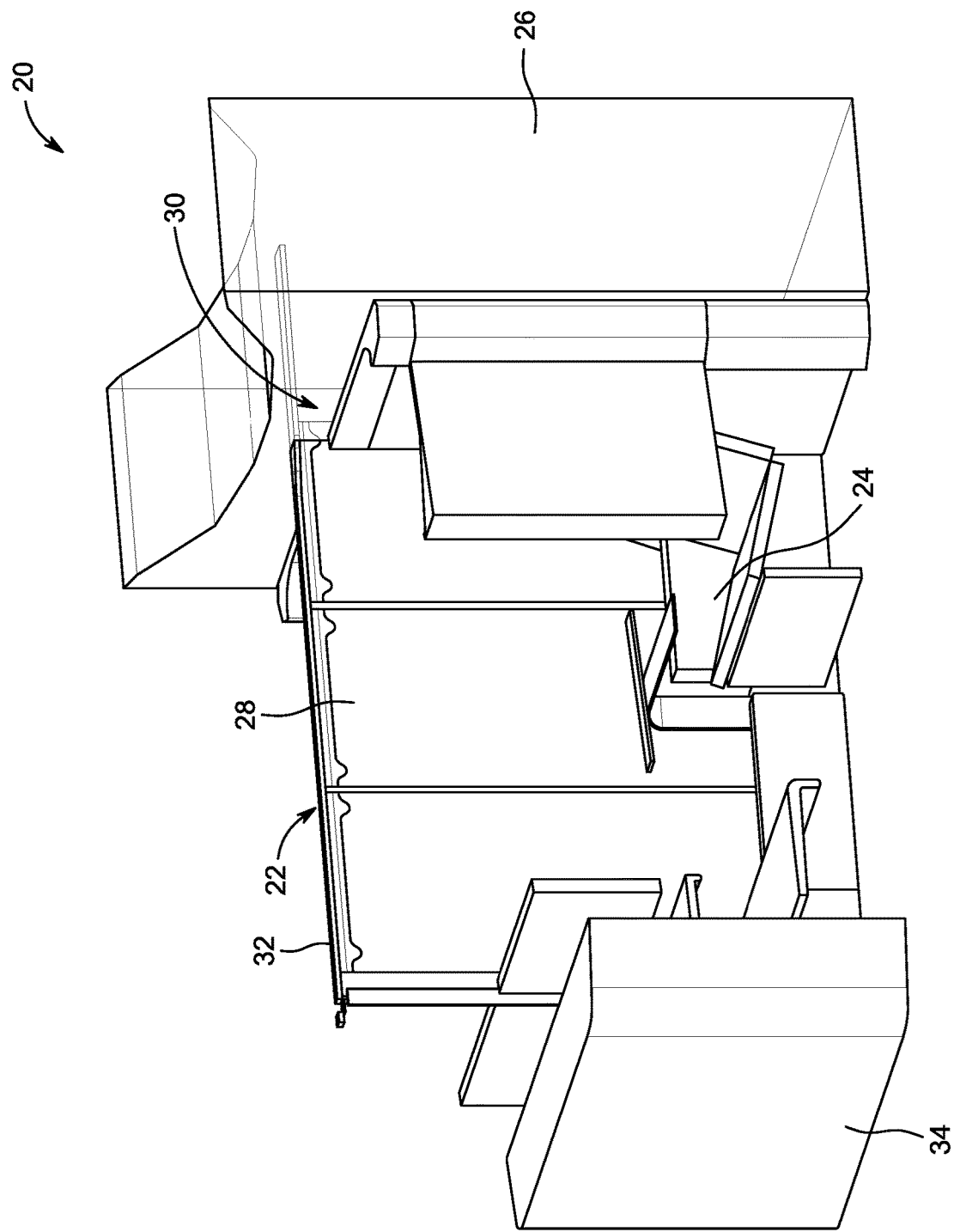
FIG. 1 is a perspective view of an exemplary business class passenger seat arrangement including a privacy screen assembly in accordance with an embodiment of the present disclosure, showing the privacy screen fully deployed.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are generally directed to multi-panel privacy screen assemblies and mechanism for driving panel motion. The inventive concepts disclosed herein are further directed to panel deployment mechanisms operable for deploying separate panels according to a predetermined deployment sequence. Such multi-panel privacy assemblies are particularly suited for business class seating arrangements including laterally-adjacent business class seats arranged such that a partition can be utilized to relax or enhance privacy between the seated passengers. The assemblies discussed herein utilize suspending hanging panels, thus obviating the need for floor tracks, among other advantages.

As discussed herein, business seating classes may include various passenger seat arrangements depending on the cabin width and length, and seating density. Applicable to the inventive concepts discussed herein, seats may be paired into groups or units in which seats are laterally adjacent and may be parallel or at an angle to one another. Each seat generally includes a seat bottom and a backrest and may optionally include a leg rest or may utilize a spaced ottoman. Each passenger seat may be configured to transition between an upright sitting position for taxi, take-off and landing (TTOL), and a horizontal sleeping position during flight. In the horizontal sleeping position, the backrest and the seat bottom, and optionally the leg rest and ottoman when present, may be coplanar and substantially horizontal to form a flat bed. Intermediate sitting positions may also be achievable by adjusting the angle of any or all of the seat bottom, backrest, leg rest, ottoman, etc. Intermediate sitting positions may include, but are not limited to, reclined sitting positions, cradle sitting positions, zero-G sitting positions, etc. Seat adjustment may be passenger and/or crew controlled through the use of one or more actuators. Each seat may optionally include a separately adjustable headrest or a headrest integrated into the backrest.

Benefits derived from the multi-panel privacy assemblies discussed herein include, but are not limited to, enhanced privacy between laterally adjacent seats, customizable deployment sequences, off-floor track positioning, and universal application to various business class seating arrangements.

Figure 2:
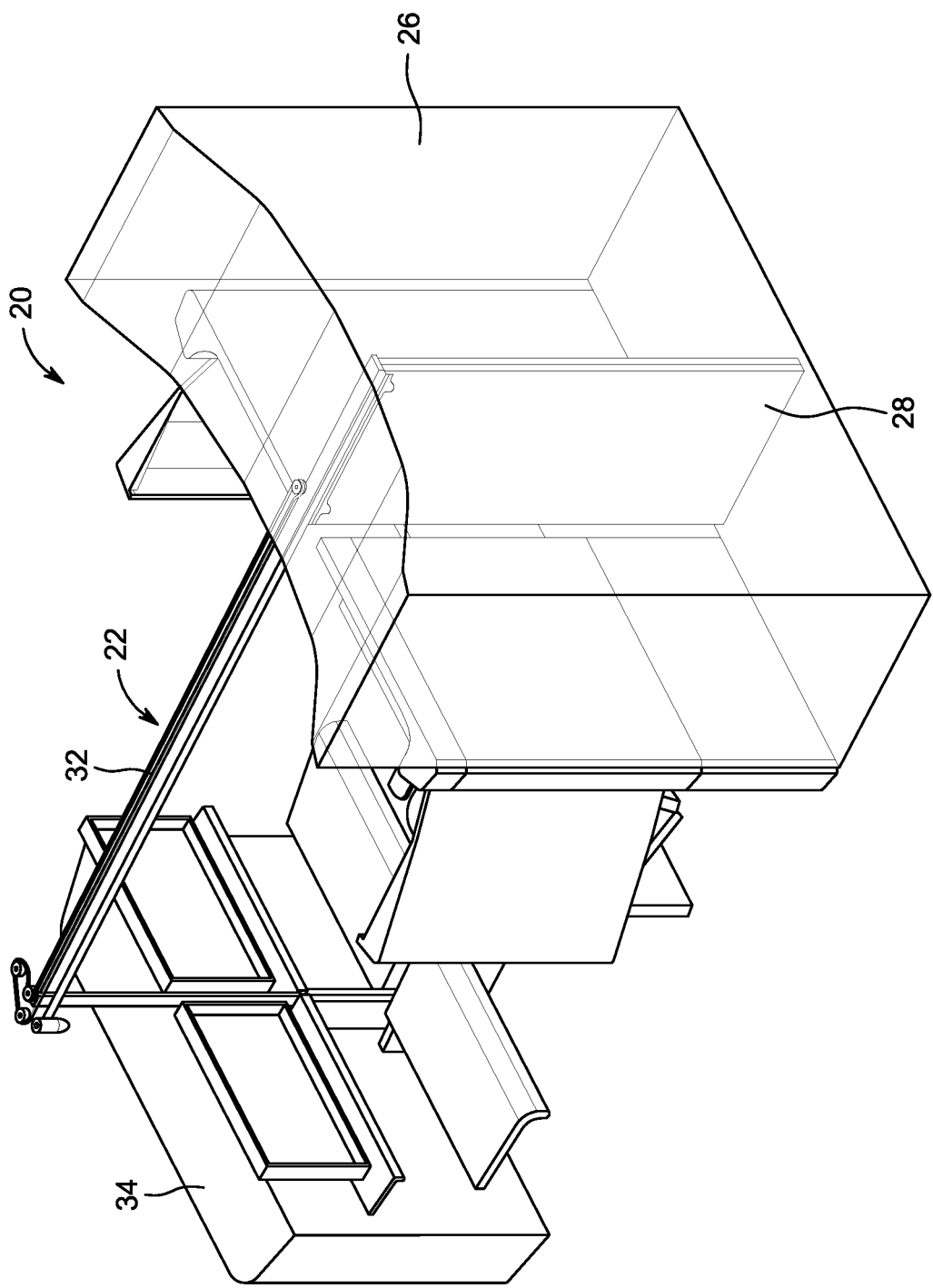
FIG. 2 is a perspective view of the passenger seat arrangement of FIG. 1 showing the privacy screen fully stowed.
Figure 3:
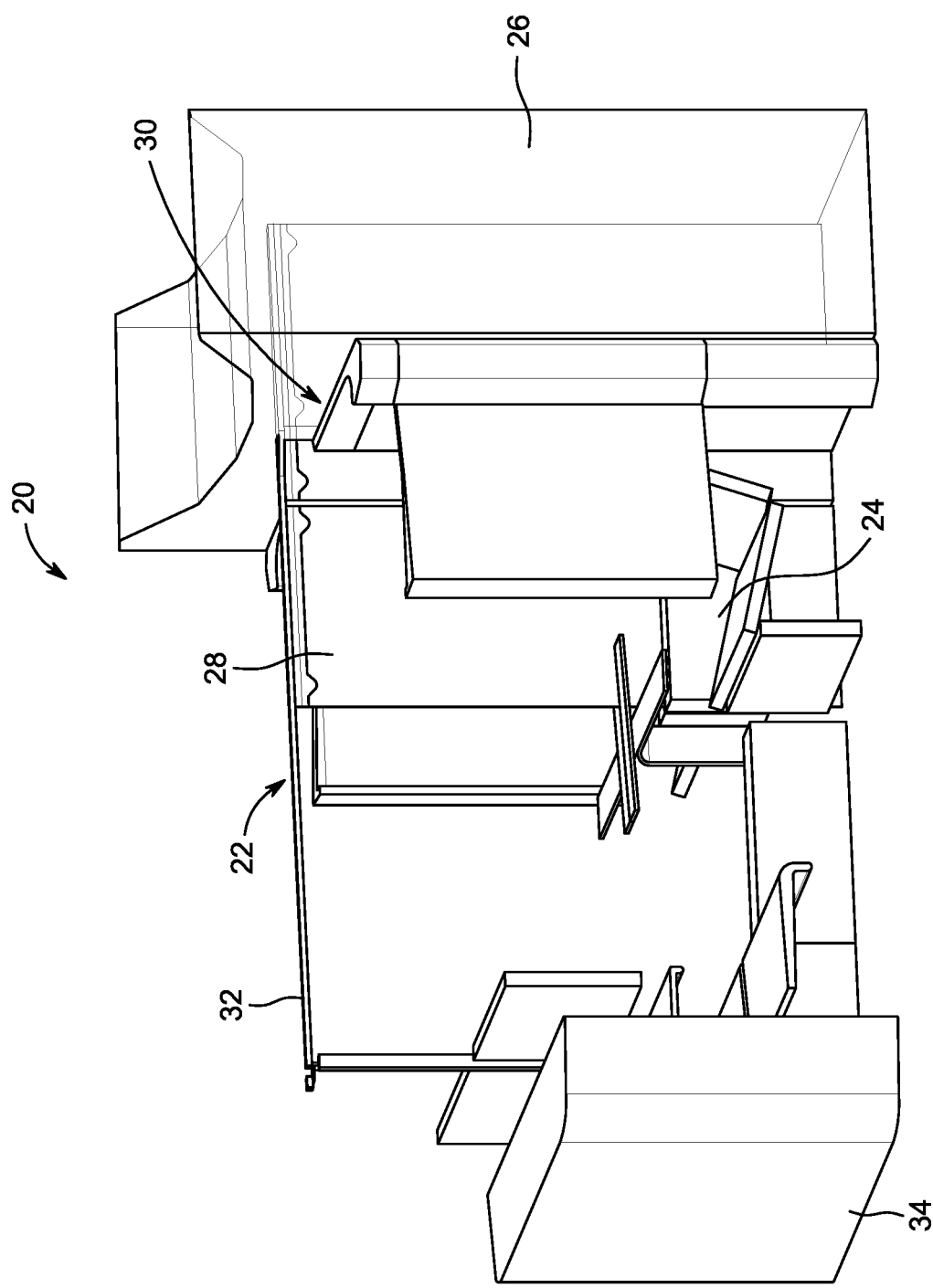
FIG. 3 is a perspective view of the passenger seat arrangement of FIG. 1 showing the privacy screen partially deployed.

Referring to the drawing figures, FIGS. 1-3 show a non-limiting example of a passenger seat arrangement 20 configured with an embodiment of a multi-panel privacy assembly 22 according to an embodiment of the present disclosure. The assembly may be provided and/or installed as an assembled modular structure in whole or in pieces. The passenger seat arrangement 20 is generally divided into two portions of halves, each for accommodating a single traveling passenger. Each portion includes a passenger seat 24 and passenger amenities including, but not limited to, armrests, ottomans, tray tables, video monitors, etc.

A monument 26 positioned aft of the passenger seats 24 functions as a storage area for the stowed hanging panels 28. The monument 26 may be part of another seating group, closet, lavatory, etc., and thus may have functionality in addition to a panel storage area. The monument 26 houses the hanging panels 28 and the hanging panels deploy through a centered vertical opening 30 through the forward end of the monument. FIG. 1 shows a three-panel hanging panel configuration wherein all three hanging panels 28 are deployed, thereby providing a continuous partition between the laterally-adjacent passenger seats 24. FIG. 2 shows all three hanging panels 28 stowed within the monument 26. FIG. 3 shows two of the hanging panels 28 deployed, at least partially, and the third hanging 28 panel stowed. Thus, comparing the figures, various states of deployment are achievable and deployment may be according to a predetermined sequence.

In some embodiments disclosed herein, the multi-panel privacy assembly 22 generally includes an elongated overhead beam 32 with at least one track. The aft end of the elongated beam 32, also referred to herein as the "storage end," is the beam end where the hanging panels 28 are stowed. The forward end of the beam, also referred to herein as the "deployed end," is farthest from the passenger seats 24. As discussed further below, the gear arrangement for driving panel motion may be housed at the forward end of the elongated beam 32, for example, in a housing 34 that may be part of the passenger seat arrangement 20, part of an adjacent seat arrangement, part of a monument, etc.

Figure 4:
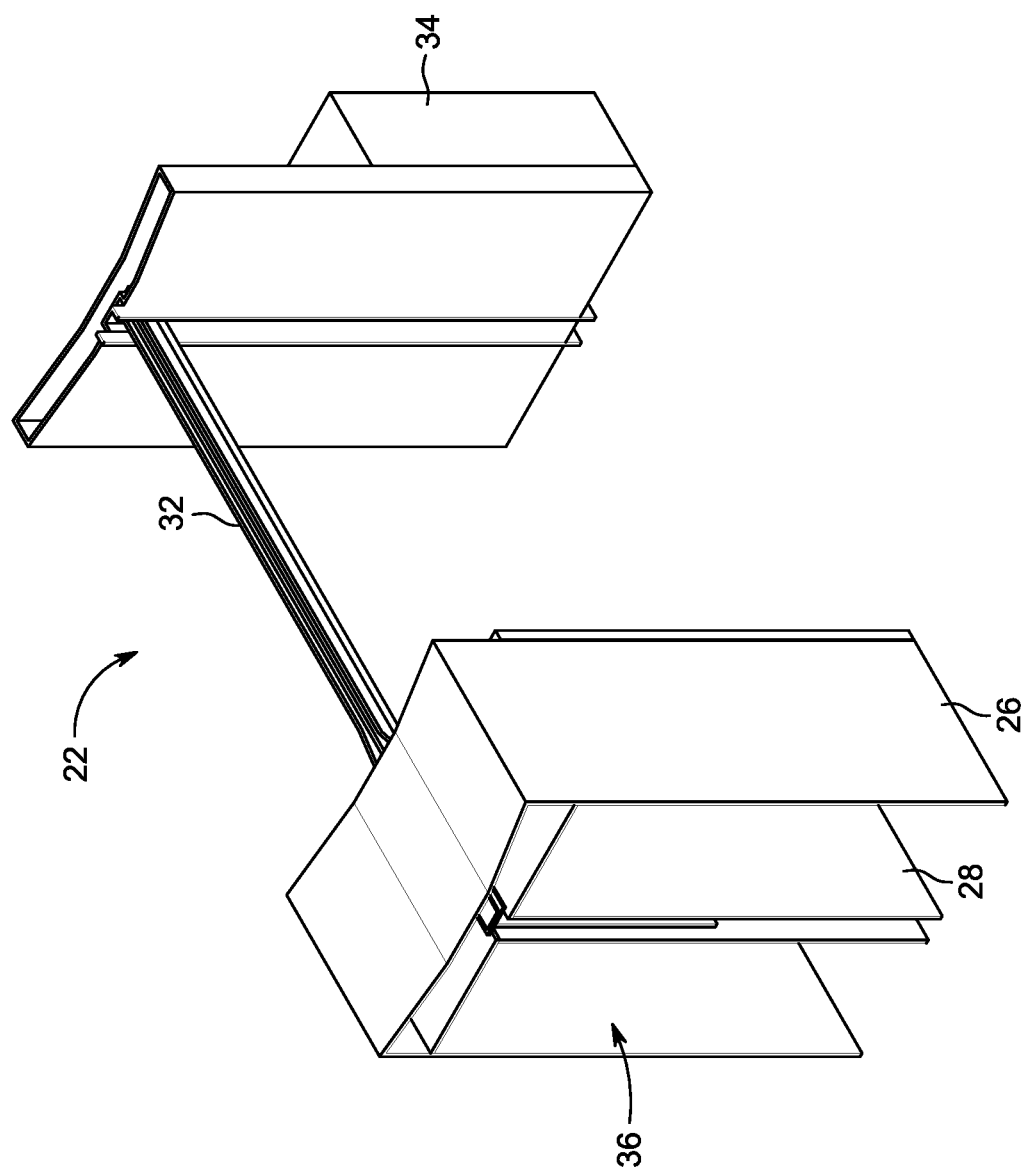
FIG. 4 is a top perspective view of a privacy screen assembly in accordance with an embodiment of the present disclosure, showing the privacy screen fully stowed.
Figure 5:
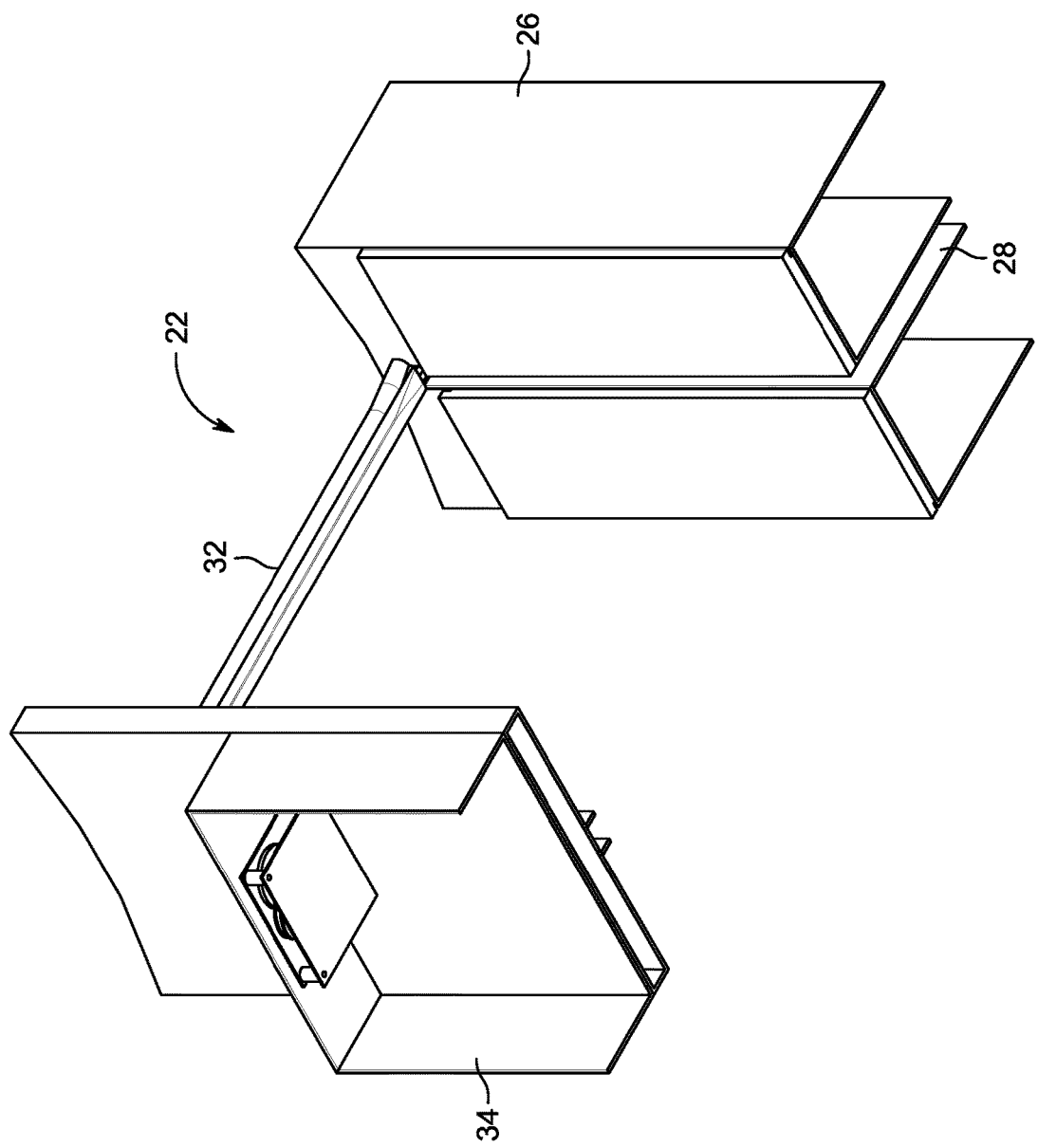
FIG. 5 is a bottom perspective view of the privacy screen assembly of FIG. 4 showing the privacy screen fully stowed.
Figure 6:
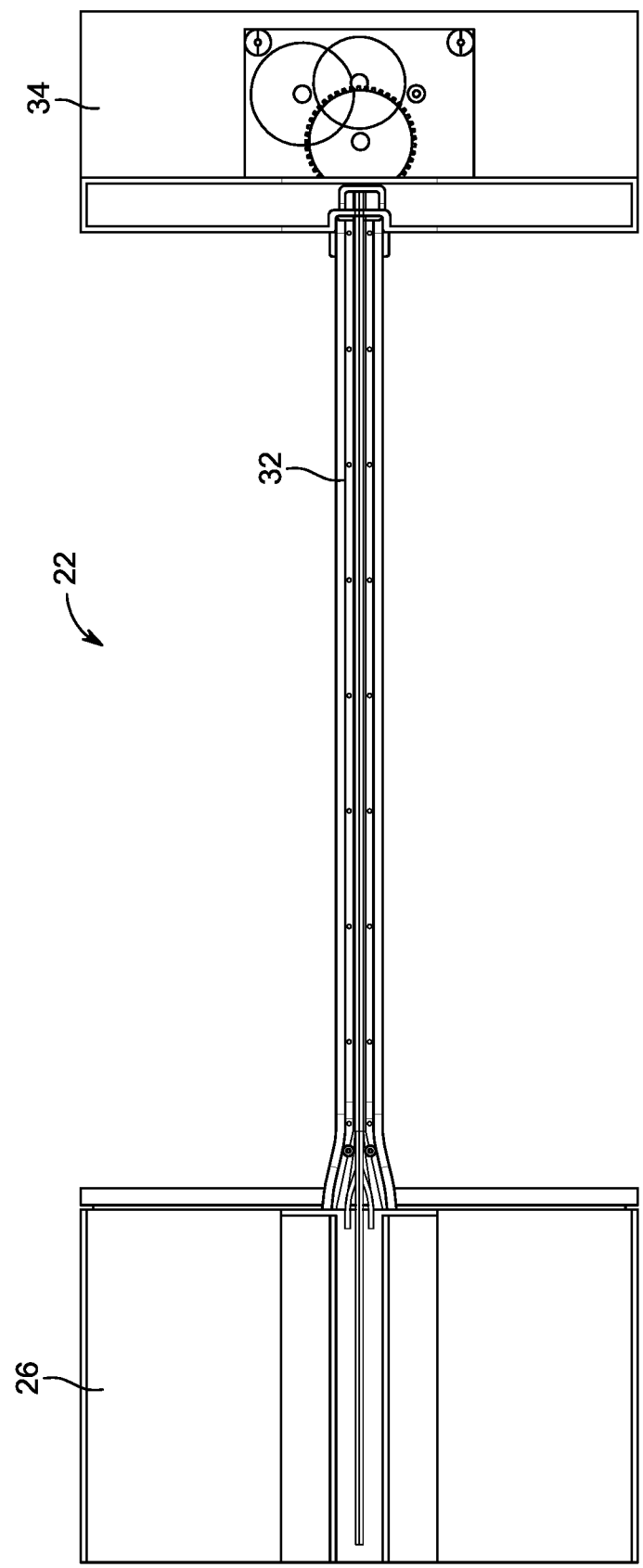
FIG. 6 is a top plan view of the privacy screen assembly of FIG. 4.
Figure 7:
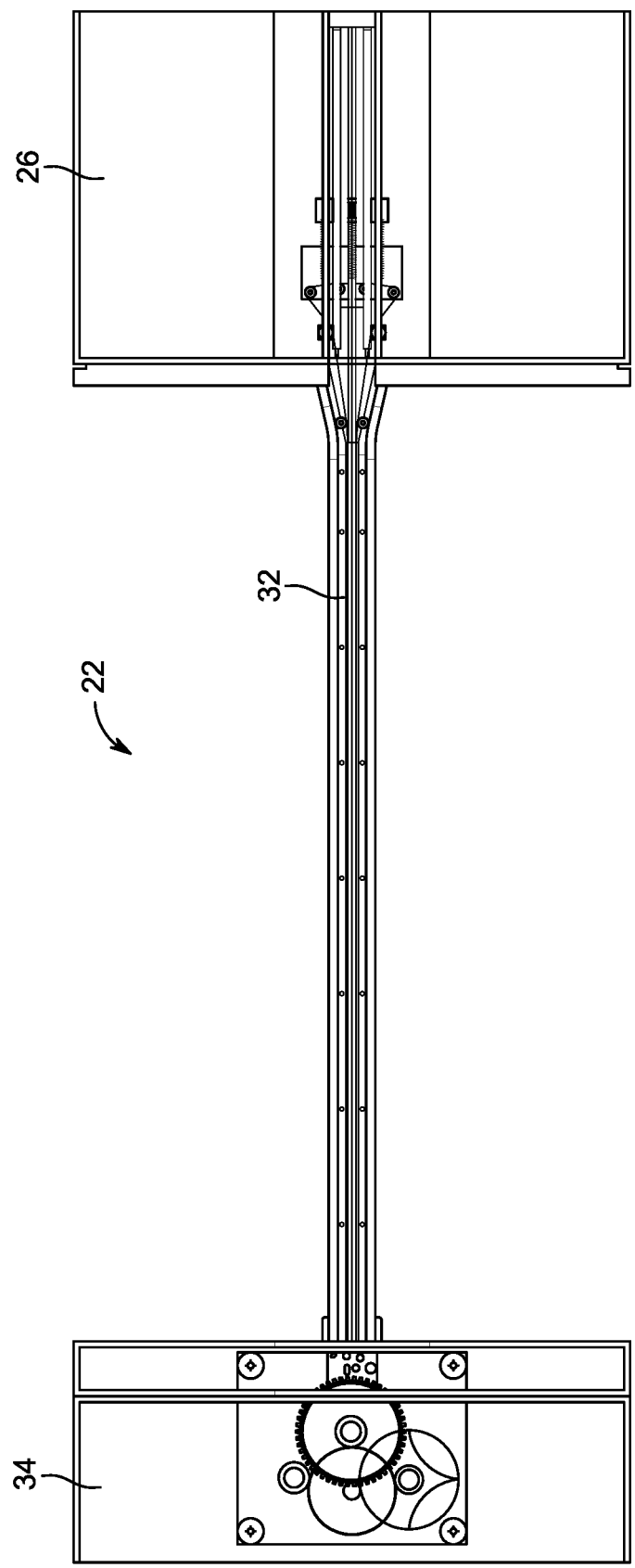
FIG. 7 is a bottom plan view of the privacy screen assembly of FIG. 4.

FIGS. 4-7 show the general components of the multi-panel privacy assembly 22 according to an embodiment. The assembly 22 may be utilized with any passenger seat arrangement or other cabin configuration where it is desired to selectively divide adjacent spaces. Positioning the elongated beam 32 overhead positions the panel tracks above the passengers and obviates the need for floor tracks. FIG. 4 shows alcoves 36 defined in the backside of the monument 26 that may function as storage space or other use within the cabin. The hanging panels 28 in their stowed positions occupy a small percentage of the monument interior space, leaving space to each side of the stowed hanging panels 28 for storage or other use. The monument and housing walls may be constructed from any materials and may be upholstered and/or padded, and generally serve to contain and conceal the drive mechanism of the multi-panel privacy assembly 22 discussed further below.

Figure 8:
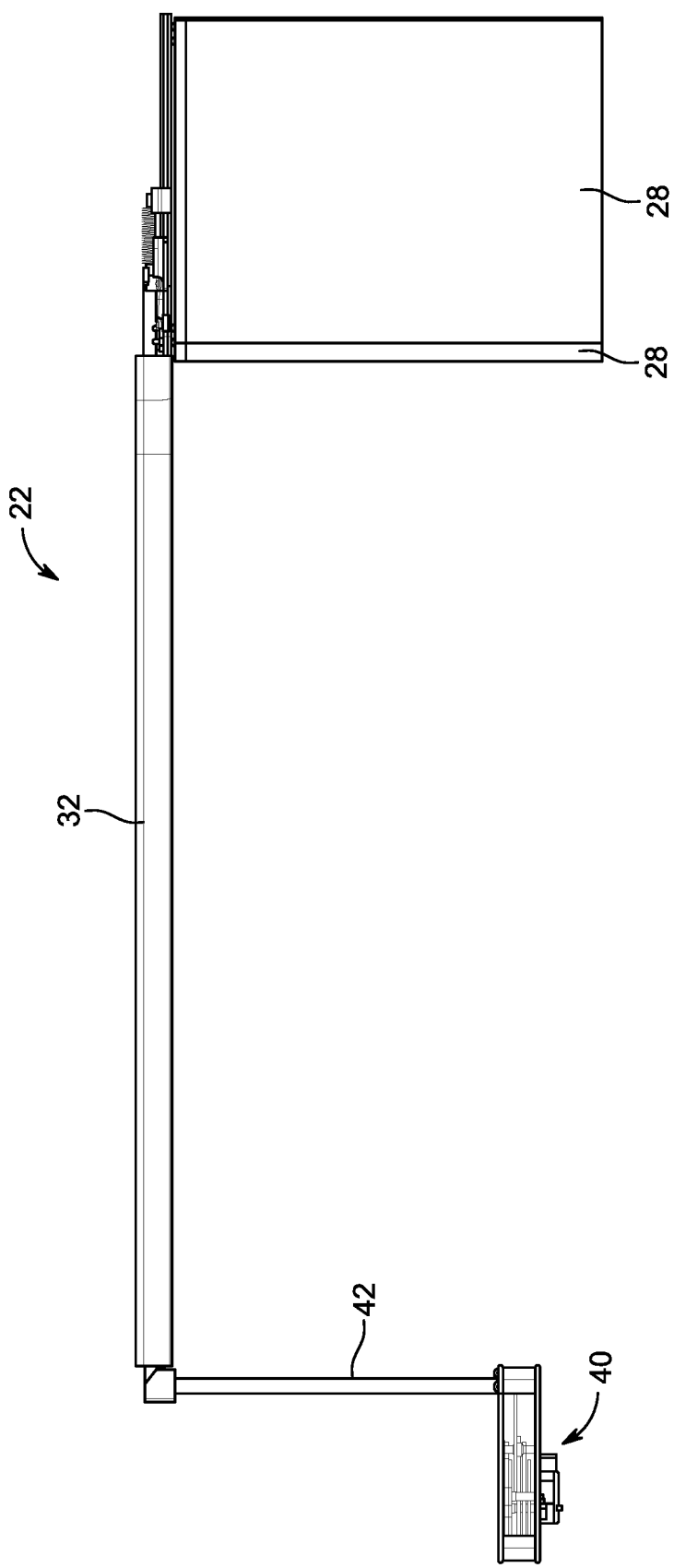
FIG. 8 is a side elevational view of the privacy screen assembly of FIG. 4.
Figure 9:
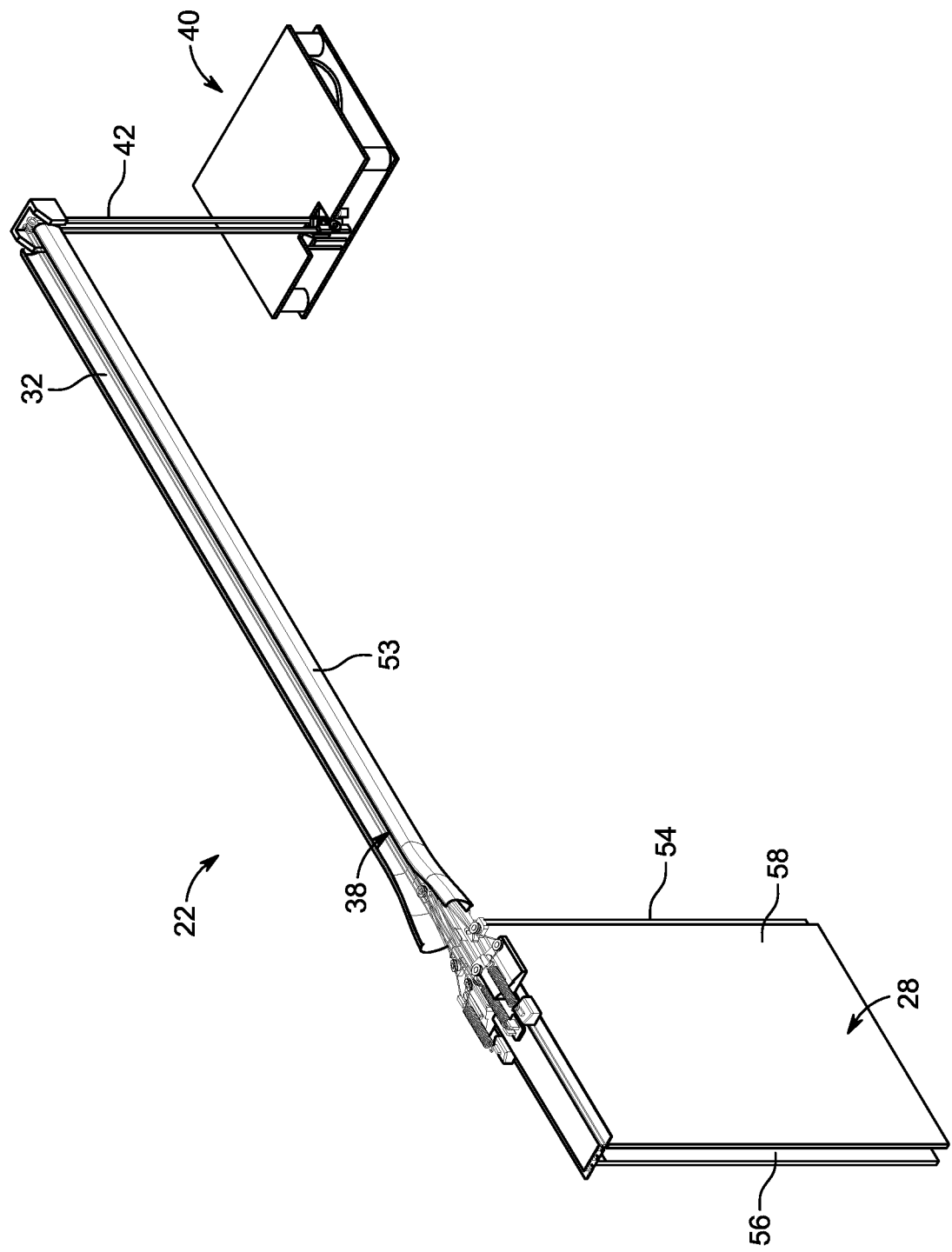
FIG. 9 is a top perspective view of the privacy screen assembly of FIG. 4 showing housing components removed for clarity.
Figure 10:
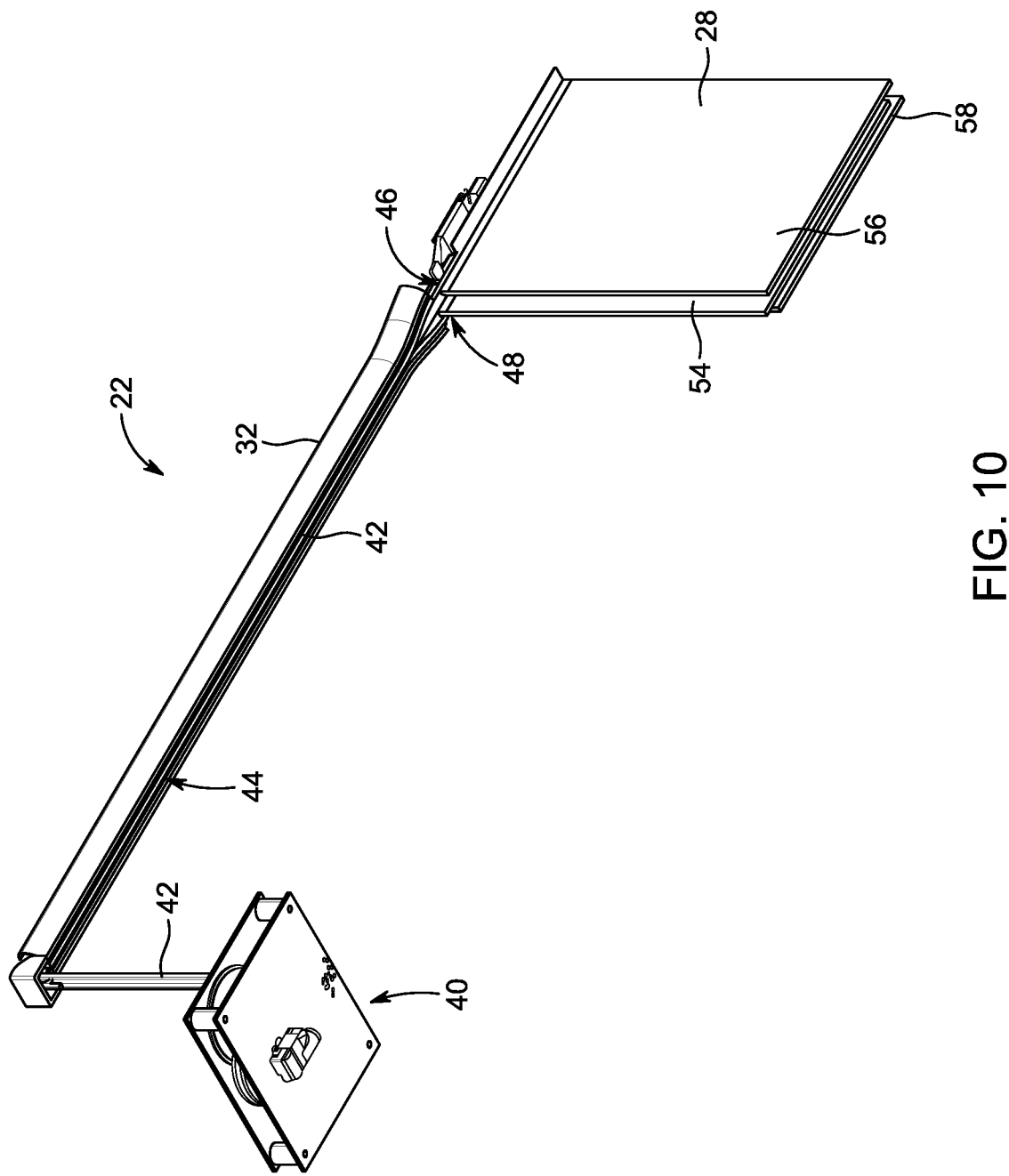
FIG. 10 is a bottom perspective view of the privacy screen assembly of FIG. 4 showing housing components removed for clarity.

FIGS. 8-10 show the multi-panel privacy screen assembly 22 generally including the elongated beam 32 having a plurality of tracks 38, the plurality of hanging panels 28, and the drive mechanism 40 operable for driving a plurality of driven cables 42 or belts to move the plurality of hanging panels 28 along at least one of the plurality of tracks. When fully stowed, the plurality of hanging panels 28 are in a stacked arrangement on separate ones of the plurality of tracks 38. When fully deployed, the plurality of hanging panels 28 are inline along one of the plurality of tracks. Depending on the placement of the drive mechanism 40 relative to the elongated beam 32, it may be necessary to guide directional changes of the driven cables 42. For example, as shown in FIG. 8, the drive mechanism 40 is disposed below the forward end of the elongated beam 32. As such, from the drive mechanism 40, the driven cables 42 are routed horizontally, then guided vertically, and finally guided horizontally to engage with their respective hanging panel 28. In other arrangements the drive mechanism may be located elsewhere and consequently other guiding arrangements are envisioned.

Figure 14:
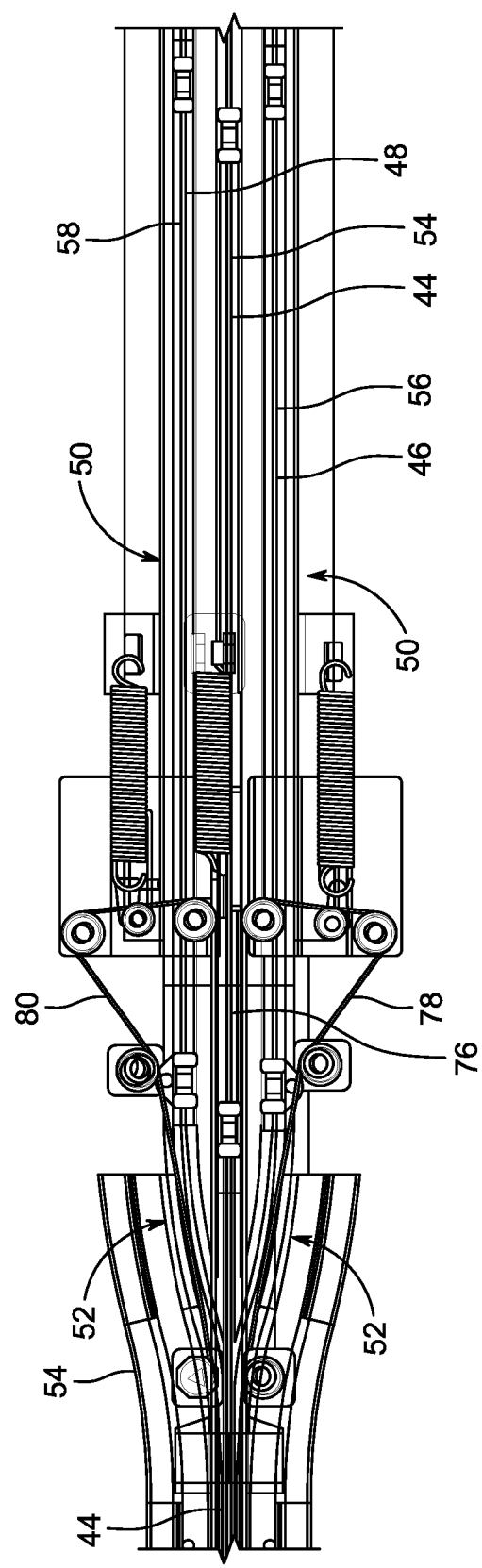
FIG. 14 is a top plan view of the storage end of the privacy screen assembly showing the cable arrangement.

In some embodiments, and also referring to FIG. 14, the plurality of tracks 38 includes a first track 44, a second track 46, and a third track 48. The first track 44 spans substantially the length of the elongated beam 32. The second track 46 is disposed at the storage end of the assembly and has a linear track portion 50 parallel with the first track 44 and a curved track end 52 transitioning the second track 46 into the first track 44. The third track 48 is also disposed at the storage end of the assembly and also has a linear track portion 50 parallel with the first track 44 and a curved track end 52 transitioning the third track 48 into the first track 44. As shown, the first track 44 is disposed between the second and third tracks 46, 48 such that the second and third tracks transition into the first track from opposing sides of the first track. As best shown in FIG. 9, a shroud 53 may be disposed along the bottom of the elongated beam 32 to conceal the underside of the elongated beam from view from below.

In some embodiments, the plurality of hanging panels includes a first panel 54, a second panel 56, and a third panel 58, wherein the first panel 54 travels along the first track 44 between stowed and deployed positions of the first panel, the second panel 56 travels along the second and first tracks 46, 44 between the stowed and deployed positions of the second panel, and the third panel 58 travels along the third and first 48, 44 tracks between the stowed and deployed positions of the third panel. In this configuration, the first, second and third hanging panels 54, 56, 58 may deploy according to a predetermined sequence in which the first panel 54 deploys first, the second panel 56 deploys second, and the third panel 58 deploys third.

The second and third tracks 46, 48 and a portion of the first track 44 coincident with the second and third tracks are disposed within the storage area positioned aft of the passenger seats. In this configuration, when the hanging panels 54, 56, 58 are fully stowed, the first panel 54 hangs from the first track 44, the second panel 56 hangs from the second track 46, and the third panel 58 hangs from the third track 48 (see FIG. 14). When the hanging panels 54, 56, 58 deploy horizontally, the first panel 54 deploys along the first track 44, the second panel 56 transitions from the second track 46 to the first track 44, and the third panel 58 transitions from the third track 48 to the first track, such that the hanging panels are stacked hanging from their respective tracks when fully stowed and are inline along the first track 44 when fully deployed. The hanging panels 54, 56, 58 move horizontally in the reverse order when stowing. The second and third hanging panels 56, 58 may be guided to their respective second and third tracks 46, 48 to be stowed using a guiding means such as mechanical guiding, magnetic attraction, etc.

Figure 11:
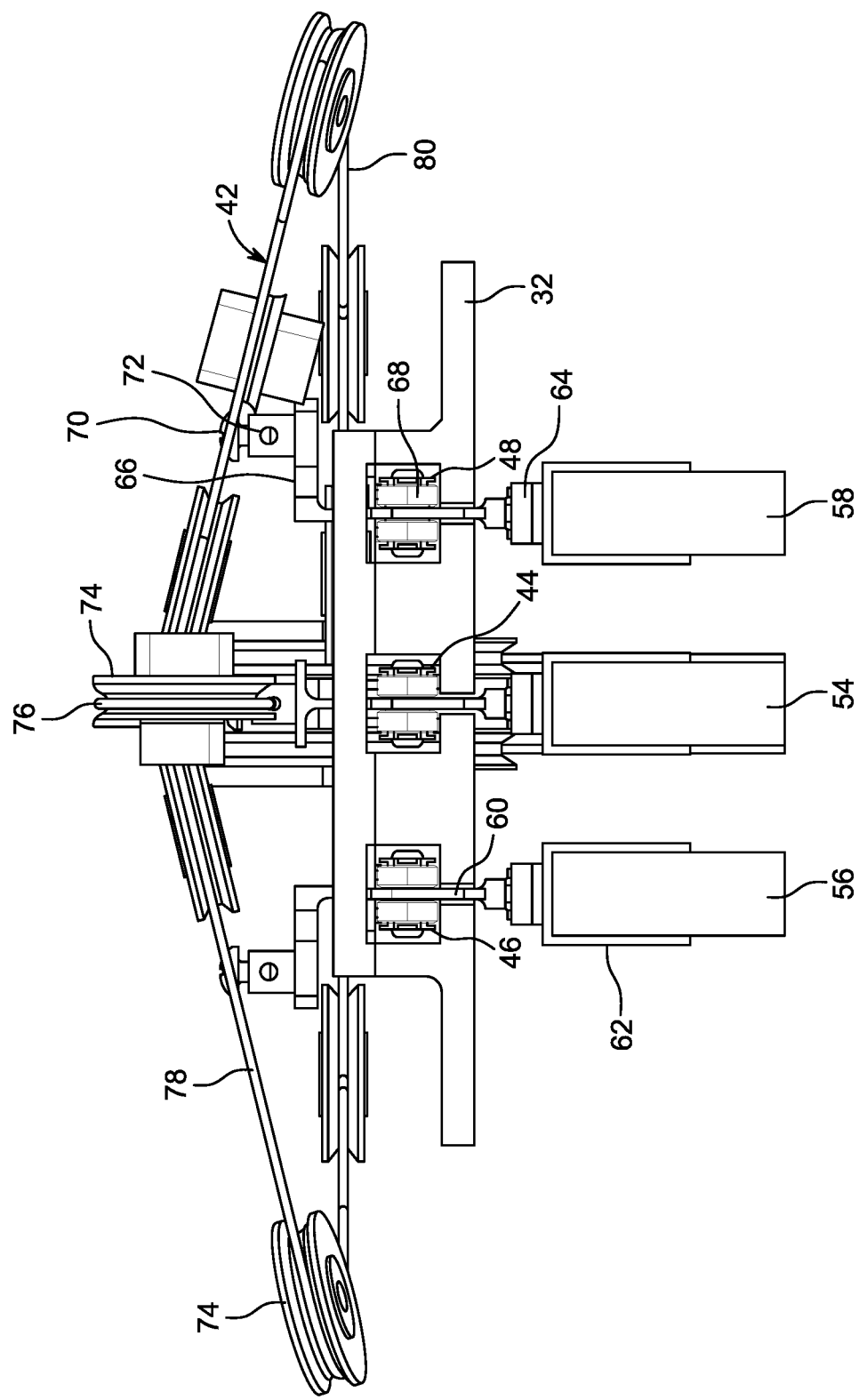
FIG. 11 is an end view of a portion of the storage end of the privacy screen assembly.

FIG. 11 shows a portion of the storage end of the elongated beam 32. Coupling members 60 are operable for suspending each of the first, second and third hanging panels 54, 56, 58 from the elongated beam 32. One or more coupling members 60 may be coupled to each hanging panel, for example connecting to an elongate C-shaped member 62 attached along the top of each panel, to stabilize the panel and minimize swing. Each coupling member 60 generally has a first end 64 coupled to a top edge of its respective hanging panel, a second end 66 coupled to one of a plurality of driven cables 42, and rollers 68 rollable along their respective one(s) of the first, second and third tracks 44, 46, 48. The coupling members 60 may be coupled to their respective driven cable 42 utilizing a set screw 70 tightened against the cable passing through a post hole 72. Cable pulleys 74 at the storage end may be used to guide and organize the various loops of driven cable 42, with each driven loop operable for driving the motion of one of the hanging panels 54, 56, 58. For example, vertically oriented pulleys may be used to guide the first driven cable 76 driving the first hanging panel 54, horizontally and angled oriented pulleys may be used to guide the second driven cable 78 driving the second hanging panel 56, and horizontally and angled oriented pulleys may be used to guide the third driven cable 80 driving the third hanging panel 58.

Figure 12:
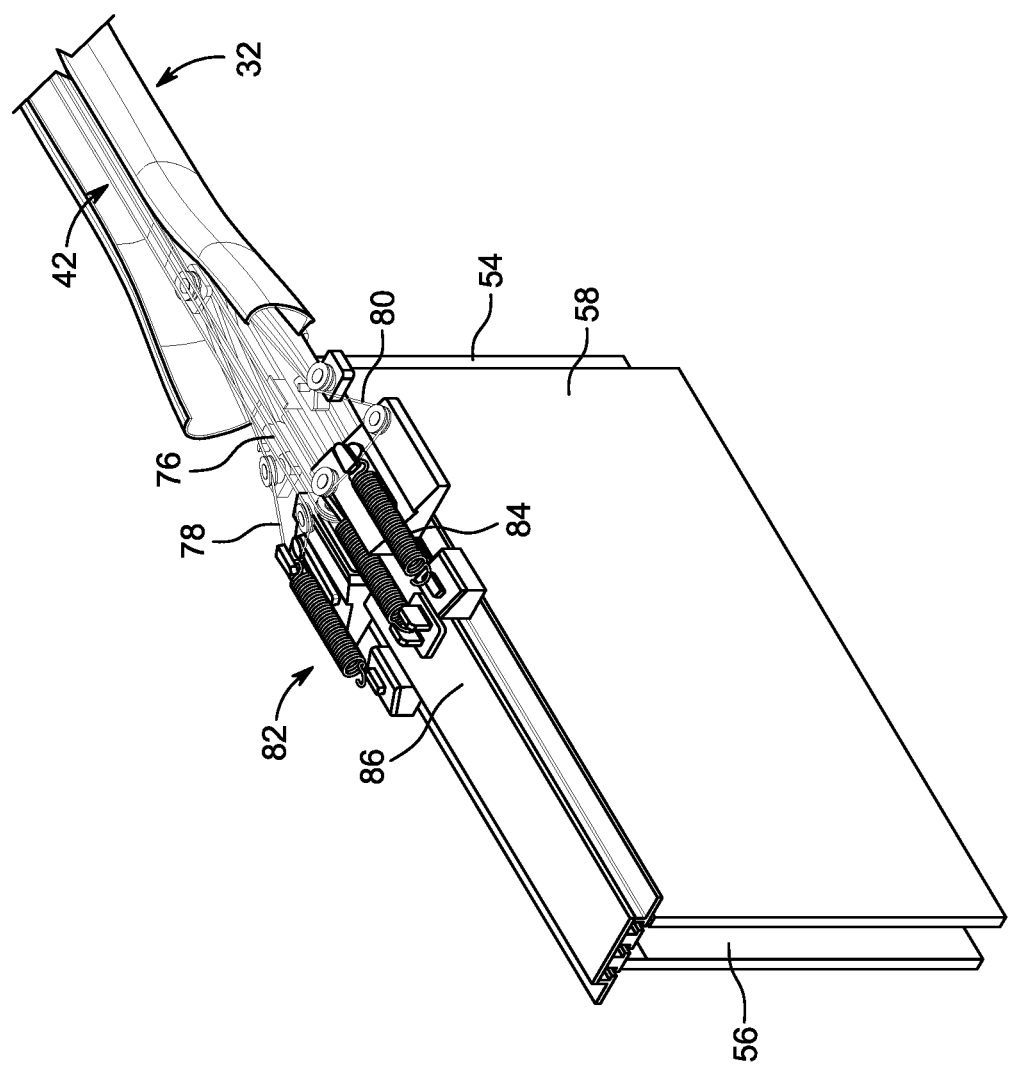
FIG. 12 is a top perspective view of a portion of the storage end of the privacy screen assembly.
Figure 13:
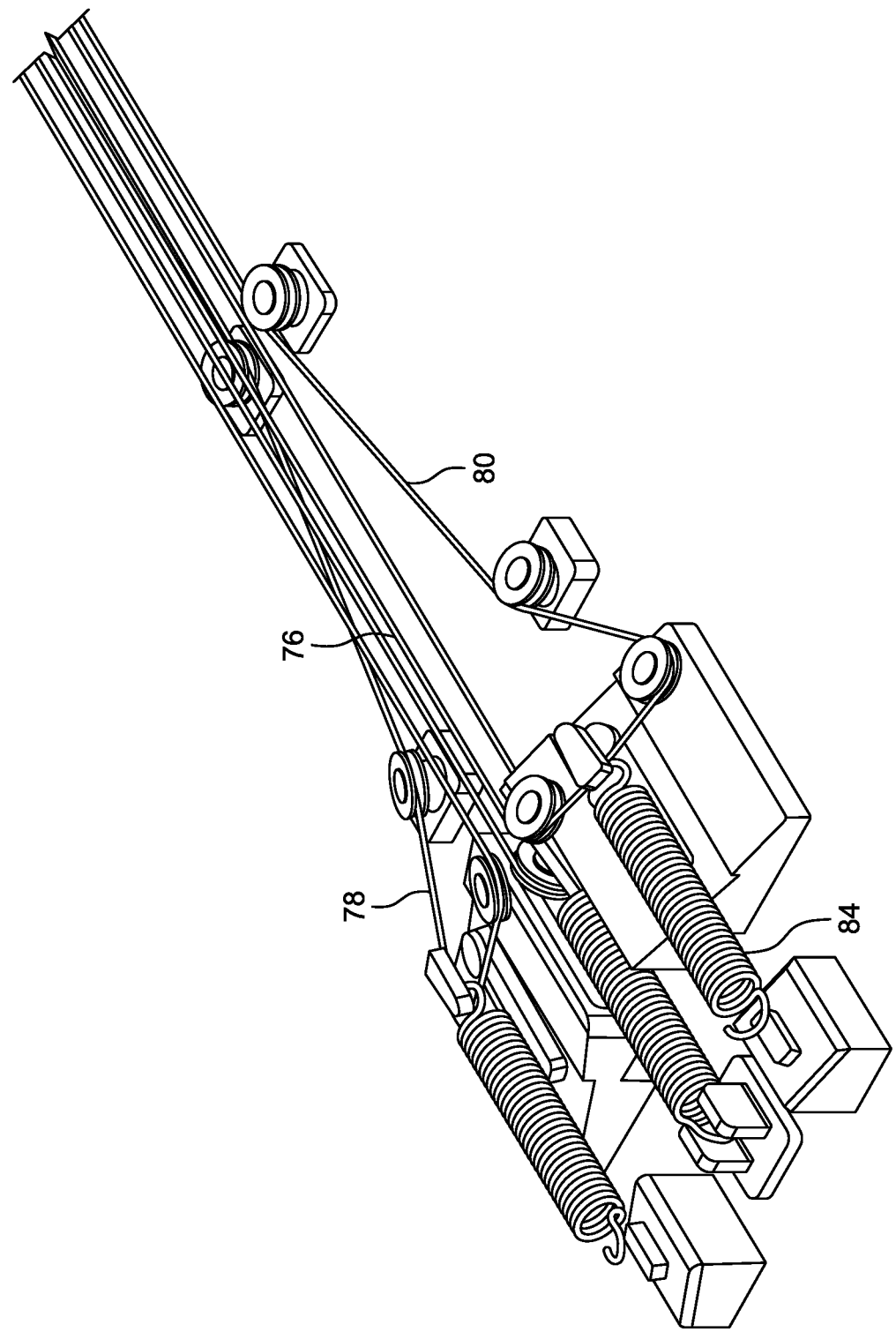
FIG. 13 is a perspective of the cable tensioners of the privacy screen assembly.

FIGS. 12-14 show the storage end of the elongated beam 32, and particularly cable tensioners 82, with one cable tensioner associated with each driven cable 42. Each cable tensioner 82 is operably coupled to one of the plurality of driven cables 76, 78, 80. Each cable tensioner 82 includes a spring 84 affixed at one end to a static element 86 such as a plate affixed atop the elongated beam 32, and at an opposing end coupled to one of the driven cables 76, 78, 80. In use, the cable tensioners 82 may function to apply a pulling force and shock absorption.

Figure 15:
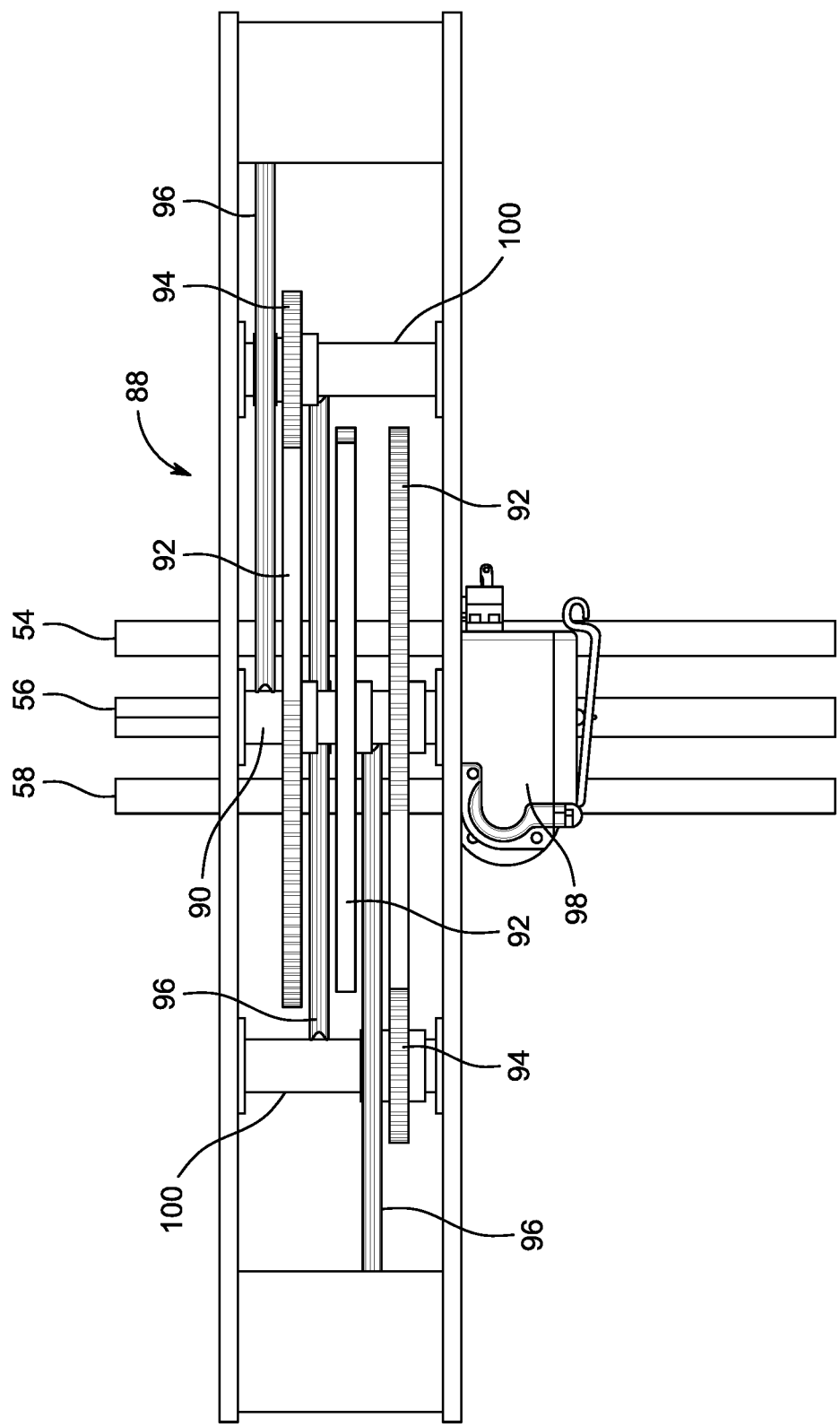
FIG. 15 is a side elevation of a portion of the gear box of the privacy screen assembly.
Figure 16:
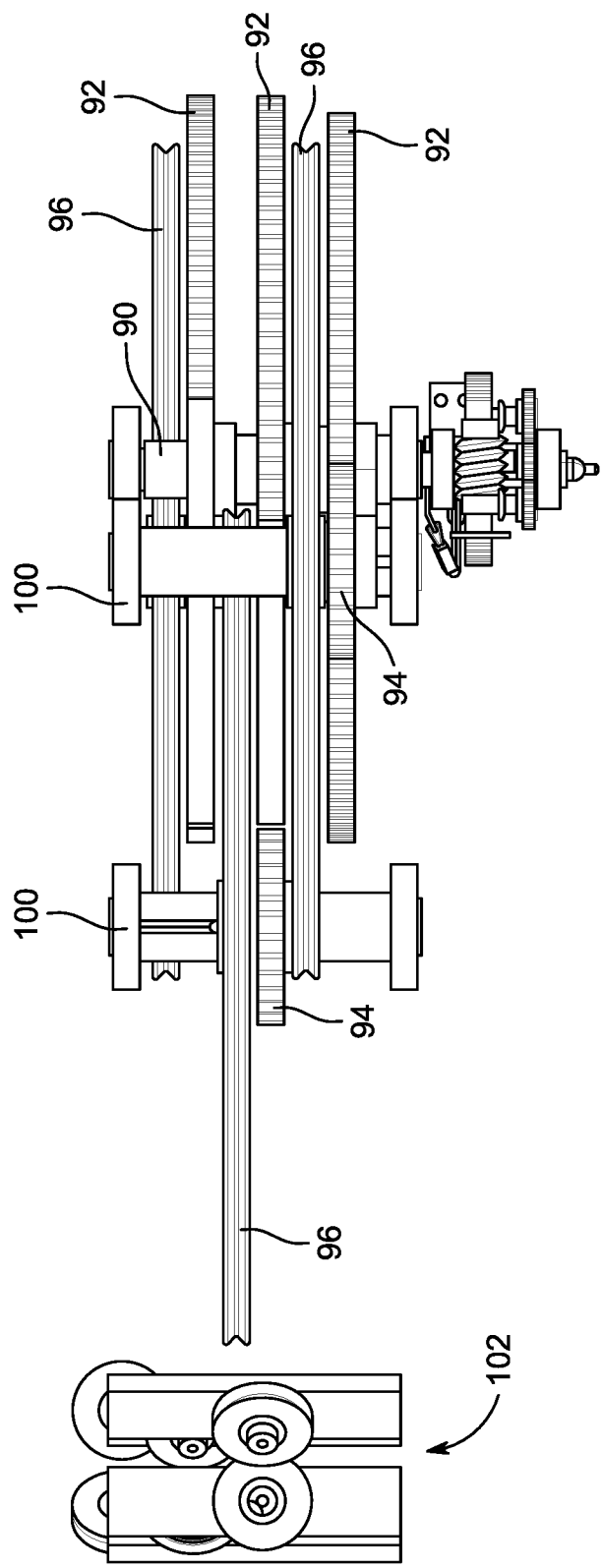
FIG. 16 is a side elevational view of the gear and guide pulley arrangement shown without with gear box for clarity.
Figure 17:
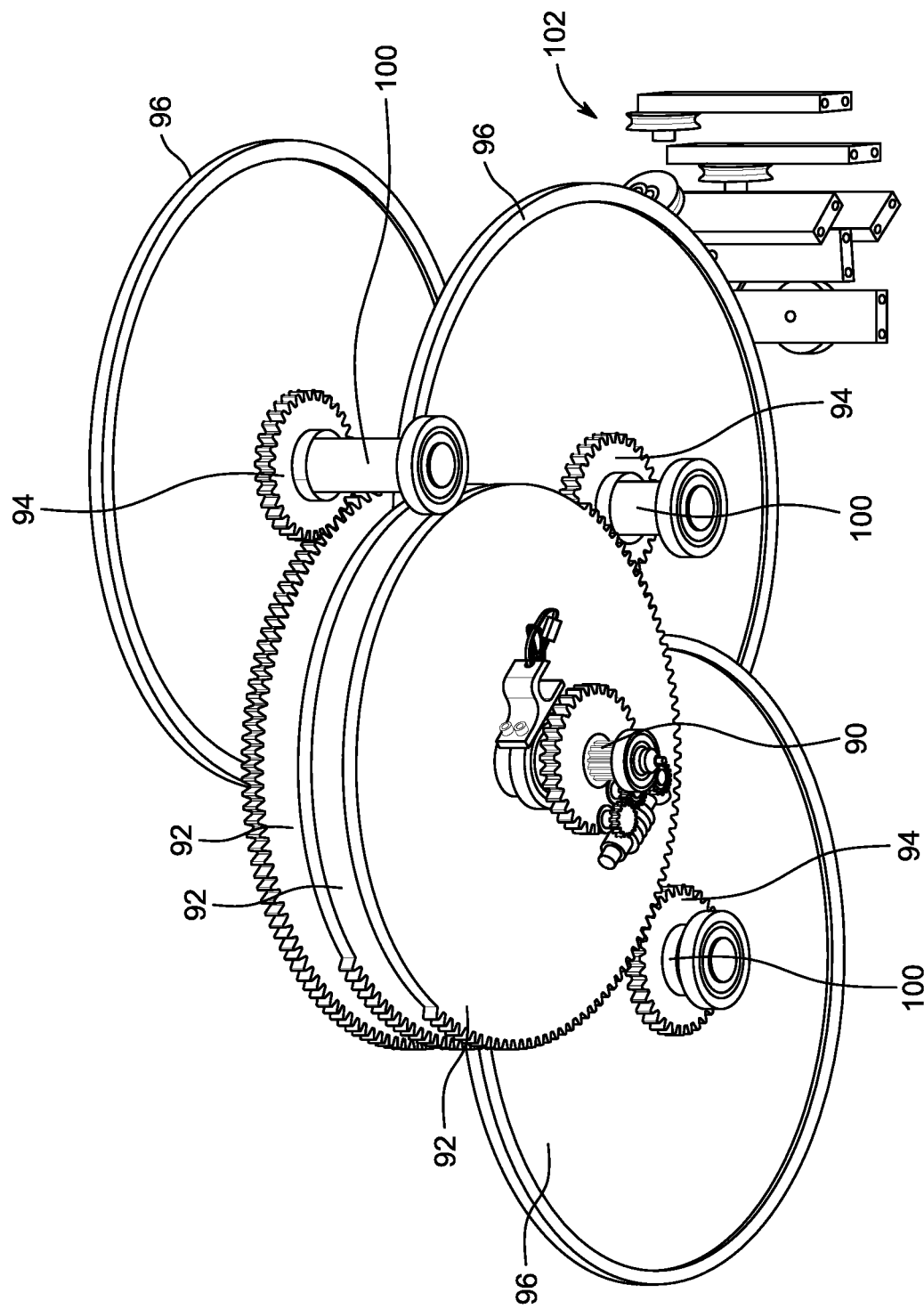
FIG. 17 is a bottom perspective view of the intermittent gear assembly controlling panel deployment.

FIGS. 15-17 show an exemplary drive mechanism for driving panel deployment. The driven cables may be driven by an intermittent gear assembly 88 generally including a motor driven shaft 90, a plurality of intermittent driver gears 92, a plurality of driven gears 94, and a plurality of cable pulleys 96. The motor driven shaft 90 is driven by a motor 98, which may be affixed to the bottom of the gear box and coupled to the motor driven shaft 90 through a worm gear or other arrangement. The plurality of intermittent driver gears 92 are rotatably coupled to the motor-driven shaft 90, and the number of intermittent driver gears corresponds to the number of hanging panels of the assembly. The plurality of driven gears 94 are each meshed with one of the plurality of intermittent driver gears 92 and are rotatably coupled to a driven shaft 100, wherein the number of driven gears and shafts corresponds to the number of intermittent driver gears 92. The plurality of pulleys 96 are each rotatably coupled to one of the plurality of driven shafts 100, and the number of pulleys corresponds to the number of driven gears. In this configuration, each of the plurality of pulleys 96 is configured to drive motion of one of the plurality of driven cables coupled to one of the plurality of hanging panels 54, 56, 58.

Each of the plurality of intermittent driver gears 92 has a predetermined tooth configuration and relative fixed position on the motor-driven shaft 90 with respect to the other ones of the plurality of intermittent driver gears to deploy the plurality of hanging panels according to a predetermined deployment sequence. For example, the intermittent driver gears 92 may be arranged and configured to first deploy the first hanging panel, followed by deploying the second hanging panel, followed by deploying the third hanging panel. Deployment sequences may include, but are not limited to, linking two panels to deploy in sequence with a delay in deploying the third panel, deploying each panel separately with a delay between deployments, deploying all panels in sequence with no delay between deployments, deploying only one panel for TTOL, deploying two panels for TTOL, deploying all three panels for TTOL, etc. Deployment may be controlled by the intermittent gear assembly configuration and communication with a control system operable for activating the motor and motor direction according to the predetermined deployment sequence.

In some embodiments, the drive mechanism may include an intermittent gear assembly including first, second and third intermittent driver gears rotatably coupled to the motor-driven shaft, wherein the first, second and third intermittent driver gears correspond to the first, second and third hanging panels, respectively. The assembly may further include first, second and third driven gears rotatably coupled to respective first, second and third driven shafts, wherein the first, second and third driven gears are meshed with the respective first, second and third intermittent driver gears. The assembly may further include first, second and third drive pulleys rotatably coupled to the respective first, second and third driven shafts, wherein each of the plurality of pulleys is configured to drive motion of one of the plurality of driven cables. FIGS. 16 and 17 further show the directional pulleys 102 configured to guide a directional change of the plurality of driven cables (not shown) extending between the drive mechanism and the plurality of hanging panels. Directional pulleys 102 may be provided in pairs in a plane of their respective cable pulley 96 to guide the cables, for example, to provide a vertical to horizontal directional change or vice versa.

Figure 18:
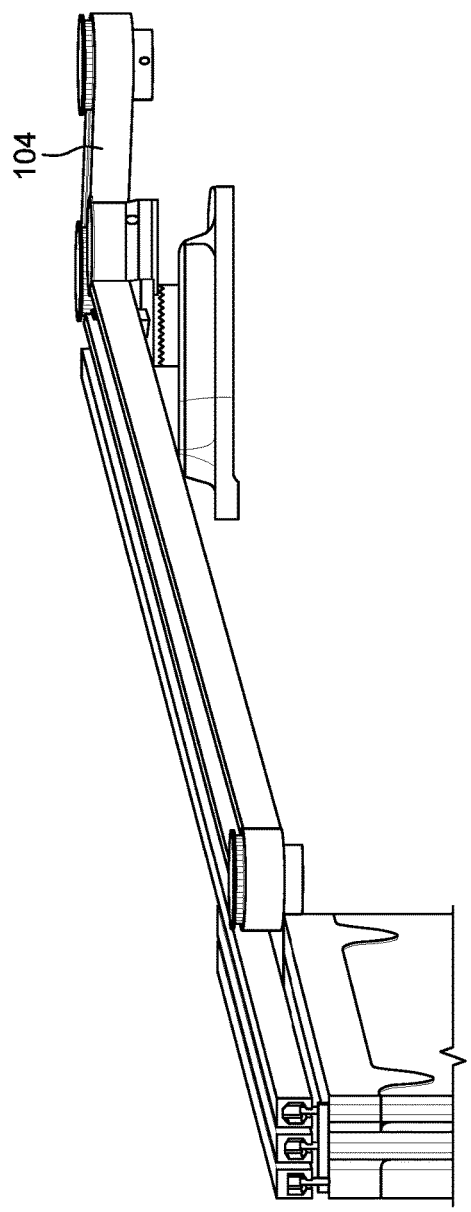
FIG. 18 is a perspective view of a portion of an alternative panel deployment mechanism utilizing a single continuous belt, in accordance with an embodiment of the present disclosure.
Figure 19:
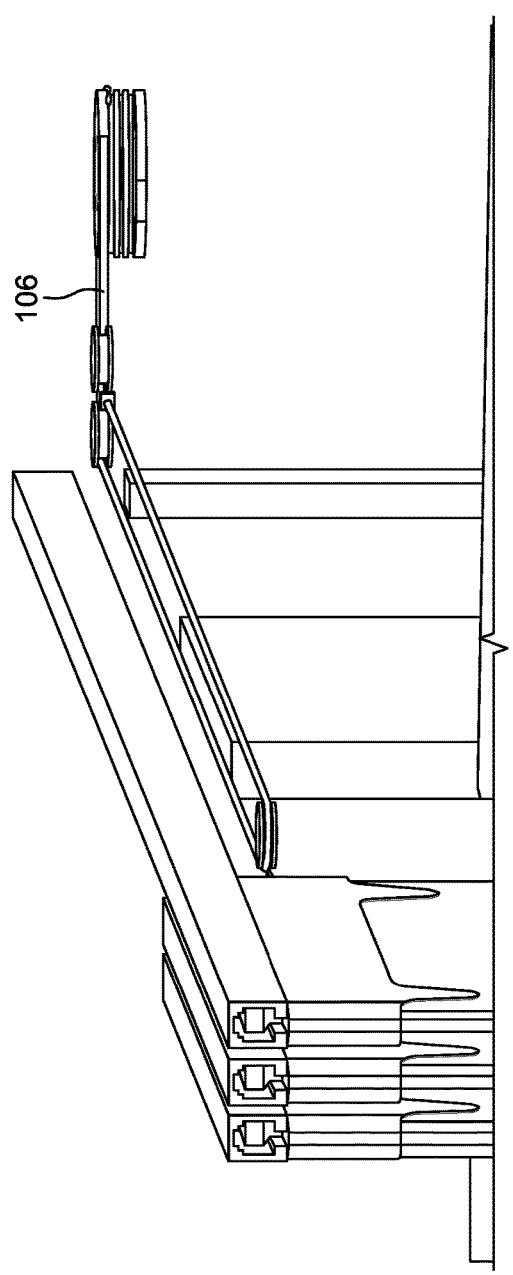
FIG. 19 is a perspective view of a portion of an alternative panel deployment mechanism utilizing a single continuous wire, in accordance with an embodiment of the present disclosure.
Figures 21A, 21B:
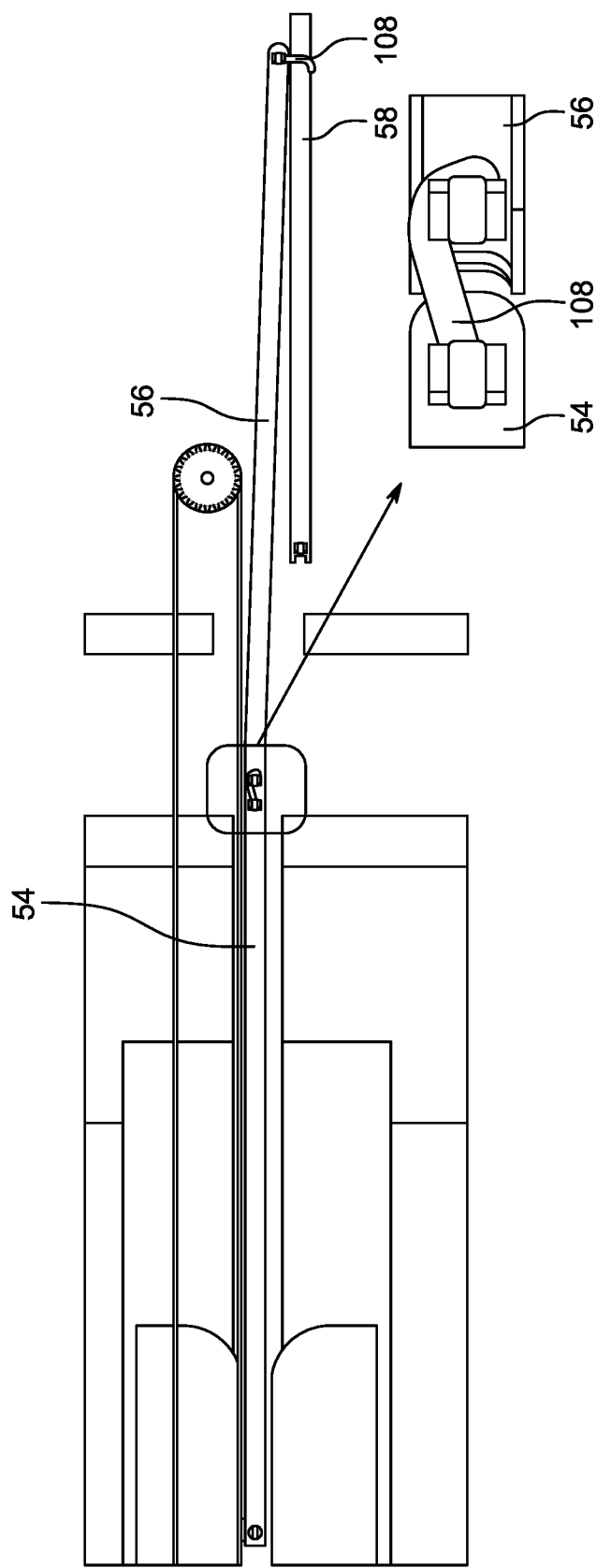
FIG. 21A is a top plan view of the storage end of the privacy screen assembly utilizing the panel deployment mechanism of FIG. 18, showing panel interconnection.
FIG. 21B is a detailed view of FIG. 21B showing spring-loaded lever arm and pin engagement.

FIG. 18 shows an alternative drive mechanism utilizing an endless belt configuration wherein one of the panels is coupled to an endless belt 104 operable for driving panel deployment. FIG. 19 shows another alternative drive mechanism utilizing an endless cable configuration wherein one of the panels is coupled to an endless cable 106 operable for driving panel deployment.

Referring to FIGS. 20A-22B, the embodiments shown in FIGS. 18 and 19 may utilize panel arrangements wherein a leading hanging panel serves to deploy a following hanging panel and so on. In this arrangement, the panels are linked such that when the first panel deployed reaches an engagement position that panel engages a following panel to pull the following panel, and so on. FIG. 20A shows a stacked track configuration and the storage end of the elongated beam 32, and FIG. 20B shows a detailed view of spring-loaded lever arms 108 that engage pins on following panels to link panel deployment. For example, the first hanging panel 54 carries a spring-loaded lever arm 108 that engages a pin atop the second hanging panel 56 when the first hanging panel reaches a predetermined relative position to the second hanging panel, and the second hanging panel 56 carries a spring-loaded lever arm 108 that engages a pin atop the third hanging panel 58 when the second hanging panel reaches a predetermined relative position to the third second hanging panel. FIGS. 21A and 21B show a panel deployment sequence and spring-loaded lever arm and pin engagement of the first and second hanging panels 54, 56. FIGS. 22A and 22B show full panel deployment inline and spring-loaded lever arm 108 and pin engagement of the first and second hanging panels 54, 56, and of the second and third hanging panels 56, 58.

Figure 23:
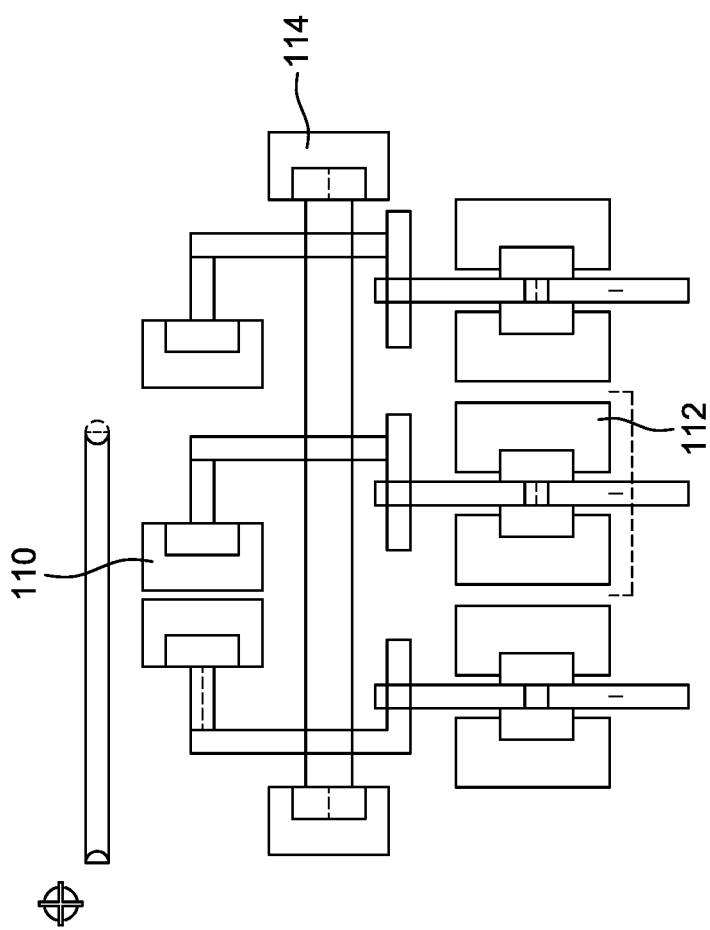
FIG. 23 is a side elevational view of an alternative panel deployment mechanism including a cam and individual track arrangement, in accordance with an embodiment of the present disclosure.
Figure 24:
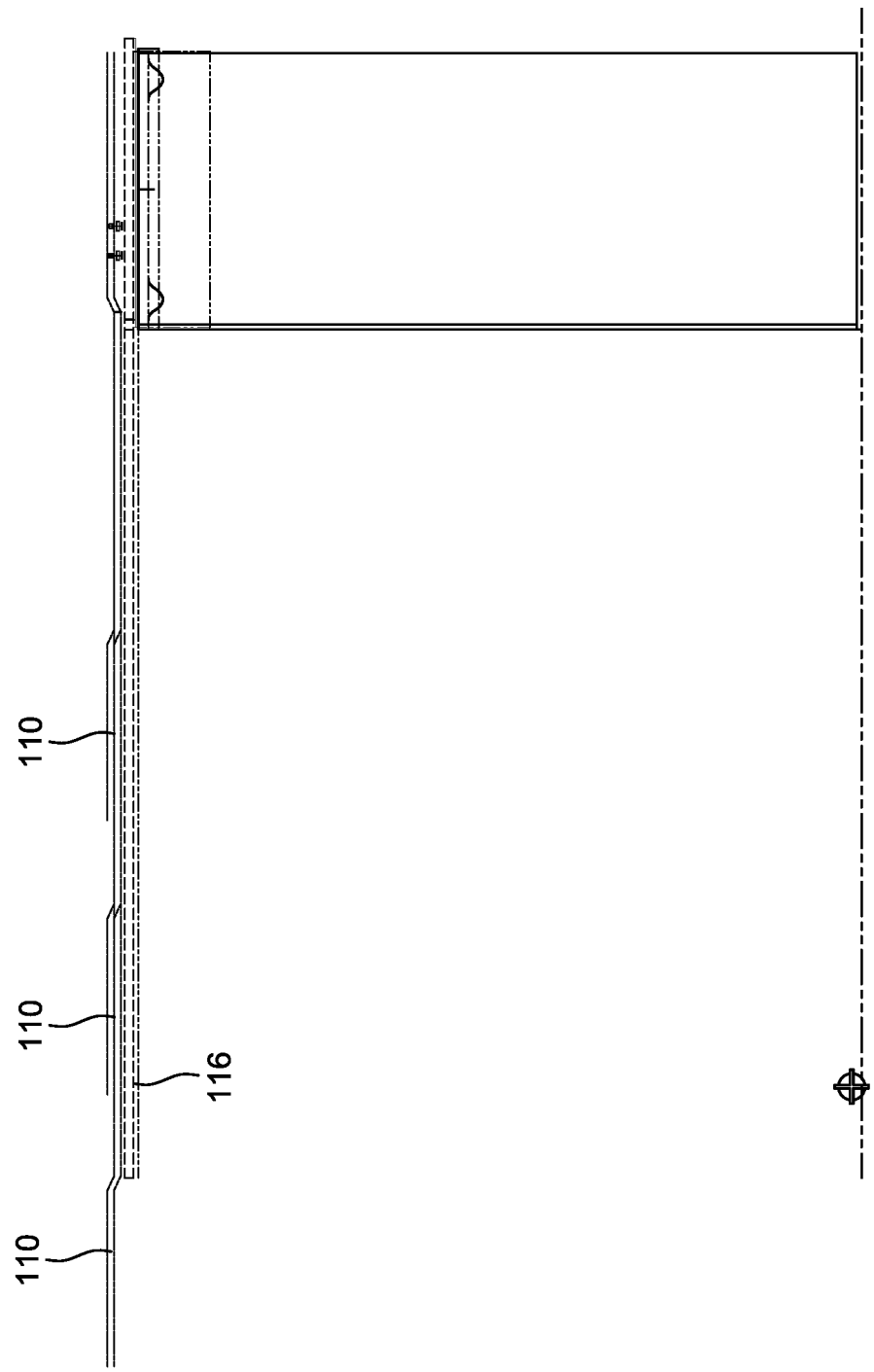
FIG. 24 is a schematic diagram showing the cam tracks, panel tracks and tracks to connect the cam and panel tracks of the deployment mechanism of FIG. 23.

FIGS. 23 and 24 show another embodiment for hanging panel deployment utilizing cam tracks 110, panel tracks 112, and tracks 114 to connect the cam and panel tracks. The cams may include three individual tracks that guide the hanging panels to slide inline with the first or center hanging panel on a main track 116.

The foregoing description provides embodiments of the inventive concepts by way of example only. It is envisioned that other embodiments may perform similar functions and/or achieve similar results. Any and all such equivalent embodiments and examples are intended to be covered by the appended claims.

What is claimed is:
1. A multi-panel privacy screen assembly, comprising:
an elongated beam having a plurality of tracks;
a plurality of hanging panels;
coupling members suspending each of the plurality of hanging panels from the elongated beam, each coupling member having a first end coupled near a top edge of one of the plurality of hanging panels, a second end coupled to one of a plurality of driven cables, and rollers rollable along at least one of the plurality of tracks; and
a drive mechanism operable for driving the plurality of driven cables to move the plurality of hanging panels along at least one of the plurality of tracks;
wherein when fully stowed the plurality of hanging panels are in a stacked arrangement on separate ones of the plurality of tracks, and when fully deployed the plurality of hanging panels are inline along one of the plurality of tracks; and
wherein the drive mechanism comprises an intermittent gear assembly, comprising:
a motor driven shaft;
a plurality of intermittent driver gears rotatably coupled to the motor-driven shaft, wherein the number of intermittent driver gears corresponds to the number of hanging panels;
a plurality of driven gears each meshed with one of the plurality of intermittent driver gears, each of the plurality of driven gears rotatably coupled to a driven shaft, wherein the number of driven gears corresponds to the number of intermittent driver gears; and
a plurality of pulleys, wherein each pulley is rotatably coupled to one of the plurality of driven shafts, and wherein the number of pulleys corresponds to the number of driven gears, wherein each of the plurality of pulleys is configured to drive motion of one of the plurality of driven cables each coupled to one of the plurality of hanging panels.

2. The privacy screen assembly of claim 1, wherein the plurality of tracks comprises:
a first track spanning substantially a length of the elongated beam;
a second track disposed at a storage end of the multi-panel privacy screen assembly, the second track having a linear track portion parallel with the first track and a curved track end transitioning the second track into the first track; and a third track disposed at a storage end of the multi-panel privacy screen assembly, the third track having a linear track portion parallel with the first track and a curved track end transitioning the third track into the first track.

3. The privacy screen assembly of claim 2, wherein the first track is disposed between the second and third tracks such that the second and third tracks transition into the first track from opposing sides of the first track.

4. The privacy screen assembly of claim 2, wherein the plurality of hanging panels comprises a first panel, a second panel, and a third panel, wherein the first panel travels along the first track between stowed and deployed positions of the first panel, the second panel travels along the second and first tracks between the stowed and deployed positions of the second panel, and the third panel travels along the third and first tracks between the stowed and deployed positions of the third panel.

5. The privacy screen assembly of claim 4, wherein the first, second and third hanging panels deploy according to a predetermined sequence in which the first panel deploys first, the second panel deploys second, and the third panel deploys third.

6. The privacy screen assembly of claim 2, wherein the second and third tracks and a portion of the first track coincident with the second and third tracks are disposed within a storage area adapted to be positioned aft of laterally-adjacent passenger seats to be separated by the plurality of hanging panels.

7. The privacy screen assembly of claim 1, wherein each of the plurality of intermittent driver gears has a predetermined tooth configuration and relative fixed position on the motor-driven shaft with respect to the other ones of the plurality of intermittent driver gears to deploy the plurality of hanging panels according to a predetermined deployment sequence.

8. The privacy screen assembly of claim 1, further comprising at least one set of directional pulleys configured to guide a directional change of the plurality of driven cables extending between the drive mechanism and the plurality of hanging panels.

9. The privacy screen assembly of claim 1, further comprising a plurality of cable tensioners each operably coupled to one of the plurality of driven cables, each cable tensioner comprising a spring affixed at one end to a static element and coupled at an opposing end to one of the plurality of driven cables.

10. A multi-panel privacy screen assembly, comprising:
an elongated overhead beam comprising a first track, a second track, and a third track, wherein the first track spans substantially a length of the elongated overhead beam and each of the second and third tracks span a portion of one end of the length of the elongated overhead beam and has a linear track portion parallel with the first track and a curved track end transitioning into the first track;
first, second and third hanging panels each suspended from the elongated overhead beam;
coupling members suspending each of the first, second and third hanging panels from the elongated overhead beam, each coupling member having a first end coupled to one of the hanging panels, a second end coupled to one of a plurality of driven cables, and rollers rollable along at least one of the first, second and third tracks, wherein the plurality of driven cables comprises a first driven cable driving motion of the first hanging panel, a second driven cable driving motion of the second hanging panel, and a third driven cable driving motion of the third handling panel; and
a drive mechanism operable for driving the first, second and third driven cables to move the respective first, second and third hanging panels along at least one of the first, second and third tracks between deployed and stowed positions.

11. The privacy screen assembly of claim 10, wherein when fully stowed the first, second and third hanging panels are in a stacked arrangement on the respective first, second and third tracks, and when fully deployed the first, second and third hanging panels are inline along the first track.

12. The privacy screen assembly of claim 10, wherein the first hanging panel travels along the first track between stowed and deployed positions of the first hanging panel, the second hanging panel travels along the second and first tracks between the stowed and deployed positions of the second hanging panel, and the third hanging panel travels along the third and first tracks between the stowed and deployed positions of the third hanging panel.

13. The privacy screen assembly of claim 10, wherein the first, second and third hanging panels deploy according to a predetermined sequence in which the first hanging panel deploys first, the second hanging panel deploys second, and the third hanging panel deploys third.

14. The privacy screen assembly of claim 10, wherein the drive mechanism comprises an intermittent gear assembly, comprising:
a motor driven shaft;
first, second and third intermittent driver gears rotatably coupled to the motor-driven shaft, wherein the first, second and third intermittent driver gears correspond to the first, second and third hanging panels, respectively;
first, second and third driven gears rotatably coupled to respective first, second and third driven shafts, wherein the first, second and third driven gears are meshed with the respective first, second and third intermittent driver gears; and
first, second and third drive pulleys rotatably coupled to the respective first, second and third driven shafts;
wherein each of the plurality of pulleys is configured to drive motion of one of the plurality of driven cables.

15. The privacy screen assembly of claim 14, wherein each of the first, second and third driver gears has a predetermined tooth configuration and relative fixed position on the motor driven shaft with respect to the other ones of the intermittent driver gears to deploy the first, second and third hanging panels according to a predetermined deployment sequence.

16. The privacy screen assembly of claim 10, further comprising at least one set of directional pulleys configured to guide a directional change of the plurality of driven cables coupled to the first, second and third hanging panels.

17. The privacy screen assembly of claim 10, further comprising a plurality of cable tensioners, each of the plurality of cable tensioners operably coupled to one of the plurality of driven cables, each cable tensioner comprising a spring affixed at one end to a static element and coupled at an opposing end to one of the plurality of driven cables.

* * * * *